(12) United States Patent
Gruhlke et al.

(10) Patent No.: US 8,902,484 B2
(45) Date of Patent: Dec. 2, 2014

(54) HOLOGRAPHIC BRIGHTNESS ENHANCEMENT FILM

(75) Inventors: Russell Wayne Gruhlke, Milpitas, CA (US); Russel Allyn Martin, Menlo Park, CA (US)

(73) Assignee: Qualcomm MEMS Technologies, Inc., San Diego, CA (US)

(*) Notice: Subject to any disclaimer, the term of this patent is extended or adjusted under 35 U.S.C. 154(b) by 342 days.

(21) Appl. No.: 12/969,224

(22) Filed: Dec. 15, 2010

(65) Prior Publication Data
US 2012/0154881 A1    Jun. 21, 2012

(51) Int. Cl.
| G02B 5/32 | (2006.01) |
| G03H 1/02 | (2006.01) |
| G02B 26/00 | (2006.01) |
| G02B 26/08 | (2006.01) |

(52) U.S. Cl.
CPC .............. *G02B 26/001* (2013.01); *G02B 5/32* (2013.01); *G02B 26/0833* (2013.01)
USPC ............................................. 359/15; 359/27

(58) Field of Classification Search
USPC ......................................................... 359/27
See application file for complete search history.

(56) References Cited

U.S. PATENT DOCUMENTS

| 2,518,647 A | 8/1950 | Teeple et al. |
| 3,813,265 A | 5/1974 | Marks A |
| 3,924,929 A | 12/1975 | Holmen et al. |
| 4,154,219 A | 5/1979 | Gupta et al. |
| 4,375,312 A | 3/1983 | Tangonan |
| 4,378,567 A | 3/1983 | Mir |
| 4,832,459 A | 5/1989 | Harper et al. |
| 4,850,682 A | 7/1989 | Gerritsen |
| 4,863,224 A | 9/1989 | Afian et al. |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi et al. |

(Continued)

FOREIGN PATENT DOCUMENTS

| CA | 2490975 A1 | 1/2004 |
| CN | 1272922 | 11/2000 |

(Continued)

OTHER PUBLICATIONS

International Search Report and Written Opinion in International Application No. PCT/US2011/064482 mailed Apr. 2, 2012.

(Continued)

*Primary Examiner* — Jade R Chwasz
(74) *Attorney, Agent, or Firm* — Knobbe, Martens, Olson & Bear LLP

(57) ABSTRACT

This disclosure provides systems, methods and apparatus, including a display device that includes an overlying holographic film. In one aspect, the holographic film includes a hologram that is configured to turn light incident on the film. The light is turned towards the display device at desired angles. The display can be formed of interferometric modulators and the turned light can be reflected off the display, and towards a viewer, to form an image. For light that is incident on the film at angles outside of a view cone, the holographic film is provided with holographic light turning features that turn this light so that it is reflected off the display at angles within a view cone of the display.

31 Claims, 12 Drawing Sheets

(56) References Cited

U.S. PATENT DOCUMENTS

| | | |
|---|---|---|
| 4,974,942 A | 12/1990 | Gross et al. |
| 5,038,224 A | 8/1991 | Martulli et al. |
| 5,042,921 A | 8/1991 | Sato et al. |
| 5,050,946 A | 9/1991 | Hathaway et al. |
| 5,110,370 A | 5/1992 | Vogeli et al. |
| 5,123,247 A | 6/1992 | Nelson |
| 5,151,585 A | 9/1992 | Siebert |
| 5,226,099 A | 7/1993 | Mignardi et al. |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,289,300 A | 2/1994 | Yamazaki et al. |
| 5,339,179 A | 8/1994 | Rudisill et al. |
| 5,361,190 A | 11/1994 | Roberts et al. |
| 5,387,953 A | 2/1995 | Minoura et al. |
| 5,387,991 A | 2/1995 | Mitsutake et al. |
| 5,398,125 A | 3/1995 | Willett et al. |
| 5,446,510 A | 8/1995 | Mitsutake et al. |
| 5,448,659 A | 9/1995 | Tsutsui et al. |
| 5,452,385 A | 9/1995 | Izumi et al. |
| 5,459,610 A | 10/1995 | Bloom et al. |
| 5,467,417 A | 11/1995 | Nakamura et al. |
| 5,481,385 A | 1/1996 | Zimmerman et al. |
| 5,515,184 A | 5/1996 | Caulfield |
| 5,517,366 A | 5/1996 | Togino |
| 5,555,160 A | 9/1996 | Tawara et al. |
| 5,555,186 A | 9/1996 | Shioya |
| 5,592,332 A | 1/1997 | Nishio et al. |
| 5,594,830 A | 1/1997 | Winston et al. |
| 5,601,351 A | 2/1997 | Van Den Brandt |
| 5,626,408 A | 5/1997 | Heynderickx et al. |
| 5,638,084 A | 6/1997 | Kalt |
| 5,647,036 A | 7/1997 | Deacon et al. |
| 5,650,865 A | 7/1997 | Smith |
| 5,659,410 A | 8/1997 | Koike et al. |
| 5,664,862 A | 9/1997 | Redmond et al. |
| 5,671,314 A | 9/1997 | Gregory et al. |
| 5,671,994 A | 9/1997 | Tai et al. |
| 5,673,128 A | 9/1997 | Ohta et al. |
| 5,703,667 A | 12/1997 | Ochiai |
| 5,712,694 A | 1/1998 | Taira et al. |
| 5,735,590 A | 4/1998 | Kashima et al. |
| 5,749,642 A | 5/1998 | Kimura et al. |
| 5,771,124 A | 6/1998 | Kintz et al. |
| 5,771,321 A | 6/1998 | Stern |
| 5,772,299 A | 6/1998 | Koo et al. |
| 5,782,993 A | 7/1998 | Ponewash |
| 5,783,614 A | 7/1998 | Chen et al. |
| 5,805,117 A | 9/1998 | Mazurek et al. |
| 5,808,708 A | 9/1998 | Oyama et al. |
| 5,810,464 A | 9/1998 | Ishikawa et al. |
| 5,815,229 A | 9/1998 | Shapiro |
| 5,816,677 A | 10/1998 | Kurematsu et al. |
| 5,835,255 A | 11/1998 | Miles |
| 5,845,035 A | 12/1998 | Wimberger-Friedl |
| 5,853,240 A | 12/1998 | Tanaka et al. |
| 5,854,872 A | 12/1998 | Tai |
| 5,877,874 A | 3/1999 | Rosenberg |
| 5,883,684 A | 3/1999 | Millikan et al. |
| 5,892,598 A | 4/1999 | Asakawa et al. |
| 5,913,594 A | 6/1999 | Iimura |
| 5,914,804 A | 6/1999 | Goossen |
| 5,914,818 A | 6/1999 | Tejada et al. |
| 5,933,183 A | 8/1999 | Enomoto et al. |
| 5,956,106 A | 9/1999 | Petersen et al. |
| 5,961,198 A | 10/1999 | Hira et al. |
| 5,975,703 A | 11/1999 | Holman et al. |
| 5,982,540 A | 11/1999 | Koike et al. |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau |
| 6,023,373 A | 2/2000 | Inoguchi et al. |
| 6,040,937 A | 3/2000 | Miles |
| 6,048,071 A | 4/2000 | Sawayama |
| 6,049,317 A | 4/2000 | Thompson et al. |
| 6,055,090 A | 4/2000 | Miles |
| 6,072,620 A | 6/2000 | Shiono et al. |
| 6,073,034 A | 6/2000 | Jacobsen et al. |
| 6,074,069 A | 6/2000 | Chao-Ching et al. |
| 6,091,469 A | 7/2000 | Naito |
| 6,099,134 A | 8/2000 | Taniguchi et al. |
| 6,123,431 A | 9/2000 | Teragaki et al. |
| 6,128,077 A | 10/2000 | Jovin et al. |
| 6,151,089 A | 11/2000 | Yang et al. |
| 6,195,196 B1 | 2/2001 | Kimura et al. |
| 6,196,691 B1 | 3/2001 | Ochiai |
| 6,199,989 B1 | 3/2001 | Maeda et al. |
| 6,211,976 B1 | 4/2001 | Popovich et al. |
| 6,213,606 B1 | 4/2001 | Holman et al. |
| 6,232,937 B1 | 5/2001 | Jacobsen et al. |
| 6,243,149 B1 | 6/2001 | Swanson et al. |
| 6,259,082 B1 | 7/2001 | Fujimoto et al. |
| 6,259,854 B1 | 7/2001 | Shinji et al. |
| 6,273,577 B1 | 8/2001 | Goto et al. |
| 6,282,010 B1 | 8/2001 | Sulzbach et al. |
| 6,283,602 B1 | 9/2001 | Kawaguchi et al. |
| 6,322,236 B1 | 11/2001 | Campbell et al. |
| 6,322,901 B1 | 11/2001 | Bawendi et al. |
| 6,323,415 B1 | 11/2001 | Uematsu et al. |
| 6,323,892 B1 | 11/2001 | Mihara |
| 6,323,987 B1 | 11/2001 | Rinaudo et al. |
| 6,356,378 B1 | 3/2002 | Huibers |
| 6,371,623 B1 | 4/2002 | Toyoda |
| 6,375,327 B2 | 4/2002 | Holman et al. |
| 6,377,535 B1 | 4/2002 | Chen et al. |
| 6,381,022 B1 | 4/2002 | Zavracky |
| 6,402,325 B1 | 6/2002 | Yamamoto |
| 6,407,785 B1 | 6/2002 | Yamazaki |
| 6,412,969 B1 | 7/2002 | Torihara et al. |
| 6,421,103 B2 | 7/2002 | Yamaguchi |
| 6,442,124 B1 | 8/2002 | Chung et al. |
| 6,454,452 B1 | 9/2002 | Sasagawa et al. |
| 6,456,279 B1 | 9/2002 | Kubo et al. |
| 6,478,432 B1 | 11/2002 | Dyner |
| 6,480,634 B1 | 11/2002 | Corrigan |
| 6,483,613 B1 | 11/2002 | Woodgate et al. |
| 6,493,475 B1 | 12/2002 | Lin |
| 6,494,588 B1 | 12/2002 | Okada |
| 6,504,589 B1 | 1/2003 | Kashima et al. |
| 6,512,626 B1 | 1/2003 | Schmidt |
| 6,520,643 B1 | 2/2003 | Holman et al. |
| 6,522,794 B1 | 2/2003 | Bischel et al. |
| 6,527,410 B2 | 3/2003 | Yamaguchi |
| 6,538,813 B1 | 3/2003 | Magno |
| 6,540,368 B2 | 4/2003 | Akaoka |
| 6,561,661 B2 | 5/2003 | Egawa |
| 6,565,225 B2 | 5/2003 | Mabuchi et al. |
| 6,574,033 B1 | 6/2003 | Chui et al. |
| 6,577,429 B1 | 6/2003 | Kurtz |
| 6,582,095 B1 | 6/2003 | Toyoda |
| 6,592,234 B2 | 7/2003 | Epstein et al. |
| 6,598,987 B1 | 7/2003 | Parikka |
| 6,603,520 B2 | 8/2003 | Umemoto |
| 6,630,968 B1 | 10/2003 | Tsuchihashi et al. |
| 6,631,998 B2 | 10/2003 | Egawa et al. |
| 6,636,322 B1 | 10/2003 | Terashita |
| 6,636,358 B2 | 10/2003 | Umemoto et al. |
| 6,642,913 B1 | 11/2003 | Kimura et al. |
| 6,642,976 B2 | 11/2003 | Umemoto et al. |
| 6,643,067 B2 | 11/2003 | Miyamae et al. |
| 6,646,772 B1 | 11/2003 | Popovich et al. |
| 6,650,455 B2 | 11/2003 | Miles |
| 6,652,109 B2 | 11/2003 | Nakamura |
| 6,657,683 B2 | 12/2003 | Richard |
| 6,659,615 B2 | 12/2003 | Umemoto |
| 6,660,997 B2 | 12/2003 | Laberge et al. |
| 6,667,782 B1 | 12/2003 | Taira et al. |
| 6,669,350 B2 | 12/2003 | Yamashita et al. |
| 6,674,562 B1 | 1/2004 | Miles |
| 6,677,709 B1 | 1/2004 | Ma et al. |
| 6,680,792 B2 | 1/2004 | Miles |

(56) References Cited

U.S. PATENT DOCUMENTS

| | | |
|---|---|---|
| 6,693,690 B2 | 2/2004 | Umemoto et al. |
| 6,696,140 B2 | 2/2004 | Suzuki |
| 6,697,403 B2 | 2/2004 | Lee et al. |
| 6,709,123 B2 | 3/2004 | Flohr et al. |
| 6,738,194 B1 | 5/2004 | Ramirez et al. |
| 6,741,377 B2 | 5/2004 | Miles |
| 6,742,907 B2 | 6/2004 | Funamoto et al. |
| 6,742,921 B2 | 6/2004 | Umemoto et al. |
| 6,747,801 B2 | 6/2004 | Umemoto et al. |
| 6,751,023 B2 | 6/2004 | Umemoto et al. |
| 6,760,135 B1 | 7/2004 | Payne et al. |
| 6,761,461 B2 | 7/2004 | Mizutani et al. |
| 6,773,126 B1 | 8/2004 | Hatjasalo et al. |
| 6,774,962 B2 | 8/2004 | Yoon |
| 6,778,746 B2 | 8/2004 | Charlton et al. |
| 6,784,948 B2 | 8/2004 | Kawashima et al. |
| 6,792,293 B1 | 9/2004 | Awan et al. |
| 6,794,119 B2 | 9/2004 | Miles |
| 6,798,469 B2 | 9/2004 | Kimura |
| 6,819,380 B2 | 11/2004 | Wen et al. |
| 6,822,745 B2 | 11/2004 | De Groot et al. |
| 6,826,000 B2 | 11/2004 | Lee et al. |
| 6,841,787 B2 | 1/2005 | Almogy |
| 6,852,396 B1 | 2/2005 | Mineo |
| 6,853,418 B2 | 2/2005 | Suzuki et al. |
| 6,862,141 B2 | 3/2005 | Olczak |
| 6,864,882 B2 | 3/2005 | Newton |
| 6,865,312 B2 | 3/2005 | Niv et al. |
| 6,866,393 B2 | 3/2005 | Yano et al. |
| 6,871,982 B2 | 3/2005 | Holman et al. |
| 6,879,354 B1 | 4/2005 | Sawayama et al. |
| 6,883,924 B2 | 4/2005 | Maeda et al. |
| 6,883,934 B2 | 4/2005 | Kawakami et al. |
| 6,885,377 B2 | 4/2005 | Lim et al. |
| 6,891,530 B2 | 5/2005 | Umemoto et al. |
| 6,897,855 B1 | 5/2005 | Matthies et al. |
| 6,917,469 B2 | 7/2005 | Momose et al. |
| 6,930,816 B2 | 8/2005 | Mochizuki |
| 6,940,653 B2 | 9/2005 | Favalora et al. |
| 6,951,401 B2 | 10/2005 | Van Hees et al. |
| 6,960,010 B2 | 11/2005 | Matsumoto et al. |
| 6,961,045 B2 | 11/2005 | Tsao |
| 6,964,484 B2 | 11/2005 | Gupta et al. |
| 6,967,779 B2 | 11/2005 | Fadel et al. |
| 6,970,031 B1 | 11/2005 | Martin et al. |
| 6,998,196 B2 | 2/2006 | Rich et al. |
| 6,999,235 B2 | 2/2006 | Nakamura |
| 7,002,726 B2 | 2/2006 | Patel et al. |
| 7,004,610 B2 | 2/2006 | Yamashita et al. |
| 7,009,754 B2 | 3/2006 | Huibers |
| 7,009,772 B2 | 3/2006 | Hsiao et al. |
| 7,010,212 B2 | 3/2006 | Emmons et al. |
| 7,012,659 B2 | 3/2006 | Smith et al. |
| 7,018,088 B2 | 3/2006 | Yu et al. |
| 7,019,734 B2 | 3/2006 | Cross et al. |
| 7,025,461 B2 | 4/2006 | Veligdan et al. |
| 7,030,949 B2 | 4/2006 | Kashima |
| 7,038,752 B2 | 5/2006 | Lin |
| 7,041,344 B2 | 5/2006 | Kusume et al. |
| 7,042,444 B2 | 5/2006 | Cok |
| 7,042,643 B2 | 5/2006 | Miles |
| 7,046,409 B2 | 5/2006 | Kihara |
| 7,054,045 B2 | 5/2006 | McPheters et al. |
| 7,056,001 B2 | 6/2006 | Chuang |
| 7,058,252 B2 | 6/2006 | Woodgate et al. |
| 7,061,226 B2 | 6/2006 | Durr |
| 7,064,875 B2 | 6/2006 | Kawano et al. |
| 7,068,948 B2 | 6/2006 | Wei et al. |
| 7,072,093 B2 | 7/2006 | Piehl et al. |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,128,459 B2 | 10/2006 | Igarashi et al. |
| 7,132,200 B1 * | 11/2006 | Ueda et al. ............ 430/1 |
| 7,133,022 B2 | 11/2006 | Grabert |
| 7,138,984 B1 | 11/2006 | Miles |
| 7,142,346 B2 | 11/2006 | Chui et al. |
| 7,142,347 B2 | 11/2006 | Islam |
| 7,156,546 B2 | 1/2007 | Higashiyama |
| 7,161,136 B1 | 1/2007 | Wenstrand et al. |
| 7,161,730 B2 | 1/2007 | Floyd |
| 7,180,672 B2 | 2/2007 | Olczak |
| 7,206,133 B2 | 4/2007 | Cassarly et al. |
| 7,210,806 B2 | 5/2007 | Holman et al. |
| 7,212,345 B2 | 5/2007 | Wilson |
| 7,218,429 B2 | 5/2007 | Batchko |
| 7,218,812 B2 | 5/2007 | Maxwell et al. |
| 7,221,418 B2 | 5/2007 | Lee et al. |
| 7,223,010 B2 | 5/2007 | Min et al. |
| 7,256,922 B2 | 8/2007 | Chui et al. |
| 7,262,754 B1 | 8/2007 | Yamazaki |
| 7,262,916 B2 | 8/2007 | Kao et al. |
| 7,264,389 B2 | 9/2007 | Sado et al. |
| 7,278,774 B2 | 10/2007 | Chang |
| 7,324,248 B2 | 1/2008 | Brotherton-Ratcliffe et al. |
| 7,324,284 B2 | 1/2008 | Olczak |
| 7,327,510 B2 | 2/2008 | Cummings et al. |
| 7,336,329 B2 | 2/2008 | Yoon |
| 7,342,705 B2 | 3/2008 | Chui et al. |
| 7,342,709 B2 | 3/2008 | Lin |
| 7,346,251 B2 | 3/2008 | Bose et al. |
| 7,352,501 B2 | 4/2008 | Chopra et al. |
| 7,352,940 B2 | 4/2008 | Charters et al. |
| 7,355,780 B2 | 4/2008 | Chui et al. |
| 7,357,552 B2 | 4/2008 | Takada |
| 7,357,557 B2 | 4/2008 | Miyashita |
| 7,359,011 B2 | 4/2008 | Hamada et al. |
| 7,360,899 B2 | 4/2008 | McGuire |
| 7,366,393 B2 | 4/2008 | Cassarly et al. |
| 7,369,292 B2 | 5/2008 | Xu et al. |
| 7,369,294 B2 | 5/2008 | Gally et al. |
| 7,375,779 B2 | 5/2008 | Lee et al. |
| 7,376,308 B2 | 5/2008 | Cheben et al. |
| 7,377,678 B2 | 5/2008 | Huang et al. |
| 7,380,969 B2 | 6/2008 | Yamashita et al. |
| 7,380,970 B2 | 6/2008 | Hwang et al. |
| 7,388,181 B2 | 6/2008 | Han et al. |
| 7,388,706 B2 | 6/2008 | Miles |
| 7,389,476 B2 | 6/2008 | Senda et al. |
| 7,400,439 B2 | 7/2008 | Holman |
| 7,403,180 B1 | 7/2008 | Silverstein et al. |
| 7,417,735 B2 | 8/2008 | Cummings et al. |
| 7,417,784 B2 | 8/2008 | Sasagawa et al. |
| 7,450,295 B2 | 11/2008 | Tung et al. |
| 7,453,612 B2 | 11/2008 | Mukawa |
| 7,453,653 B2 | 11/2008 | Dowski, Jr. et al. |
| 7,456,805 B2 | 11/2008 | Ouderkirk |
| 7,477,809 B1 | 1/2009 | Tan et al. |
| 7,498,621 B2 | 3/2009 | Seitz |
| 7,502,168 B2 | 3/2009 | Akutsu et al. |
| 7,508,571 B2 | 3/2009 | Gally |
| 7,515,336 B2 | 4/2009 | Lippey et al. |
| 7,520,642 B2 | 4/2009 | Holman et al. |
| 7,532,800 B2 | 5/2009 | Iimura |
| 7,535,466 B2 | 5/2009 | Sampsell et al. |
| 7,545,569 B2 | 6/2009 | Cassarly |
| 7,560,681 B2 | 7/2009 | Moon et al. |
| 7,561,133 B2 | 7/2009 | Mestha et al. |
| 7,561,323 B2 | 7/2009 | Gally et al. |
| 7,564,612 B2 | 7/2009 | Chui |
| 7,603,001 B2 | 10/2009 | Wang et al. |
| 7,630,123 B2 | 12/2009 | Kothari |
| 7,643,203 B2 | 1/2010 | Gousev et al. |
| 7,663,714 B2 | 2/2010 | Haga et al. |
| 7,688,494 B2 | 3/2010 | Xu et al. |
| 7,706,050 B2 | 4/2010 | Sampsell |
| 7,710,636 B2 | 5/2010 | Chui |
| 7,719,500 B2 | 5/2010 | Chui |
| 7,733,439 B2 | 6/2010 | Sampsell et al. |
| 7,750,886 B2 | 7/2010 | Sampsell |
| 7,766,498 B2 | 8/2010 | Sampsell |

(56) References Cited

U.S. PATENT DOCUMENTS

| | | |
|---|---|---|
| 7,777,954 B2 | 8/2010 | Gruhike et al. |
| 7,813,026 B2 | 10/2010 | Sampsell |
| 7,813,029 B2 | 10/2010 | Kothari et al. |
| 7,845,841 B2 | 12/2010 | Sampsell |
| 7,855,827 B2 | 12/2010 | Xu et al. |
| 7,864,395 B2 | 1/2011 | Chui |
| 7,876,397 B2 | 1/2011 | Krijn et al. |
| 7,880,954 B2 | 2/2011 | Sampsell |
| 7,907,319 B2 | 3/2011 | Miles |
| 7,911,428 B2 | 3/2011 | Gally et al. |
| 7,933,475 B2 | 4/2011 | Wang et al. |
| 7,944,602 B2 | 5/2011 | Chui |
| 8,031,133 B2 | 10/2011 | Gally et al. |
| 8,040,589 B2 | 10/2011 | Bita et al. |
| 8,059,326 B2 | 11/2011 | Miles |
| 8,068,710 B2 | 11/2011 | Bita et al. |
| 8,072,402 B2 | 12/2011 | Xu |
| 8,111,446 B2 | 2/2012 | Gally et al. |
| 8,300,304 B2 | 10/2012 | Gally et al. |
| 8,368,981 B2 | 2/2013 | Gruhlke |
| 2001/0003504 A1 | 6/2001 | Ishihara et al. |
| 2001/0019380 A1 | 9/2001 | Ishihara |
| 2001/0019479 A1 | 9/2001 | Nakabayashi et al. |
| 2001/0022636 A1 | 9/2001 | Yang et al. |
| 2001/0026001 A1 | 10/2001 | Yagi |
| 2001/0030861 A1 | 10/2001 | Oda et al. |
| 2001/0049061 A1 | 12/2001 | Nakagaki |
| 2002/0006036 A1 | 1/2002 | Egawa et al. |
| 2002/0034071 A1 | 3/2002 | Mabuchi |
| 2002/0039155 A1 | 4/2002 | Umemoto |
| 2002/0044445 A1 | 4/2002 | Bohler et al. |
| 2002/0054258 A1 | 5/2002 | Kondo et al. |
| 2002/0070931 A1 | 6/2002 | Ishikawa |
| 2002/0075245 A1 | 6/2002 | Kawashima et al. |
| 2002/0075555 A1 | 6/2002 | Miles |
| 2002/0080465 A1 | 6/2002 | Han et al. |
| 2002/0101551 A1 | 8/2002 | Akaoka |
| 2002/0105699 A1 | 8/2002 | Miracky et al. |
| 2002/0106182 A1 | 8/2002 | Kawashima |
| 2002/0149584 A1 | 10/2002 | Simpson et al. |
| 2002/0154256 A1 | 10/2002 | Gotoh et al. |
| 2002/0172039 A1 | 11/2002 | Inditsky |
| 2003/0012009 A1 | 1/2003 | Suzuki et al. |
| 2003/0016930 A1 | 1/2003 | Inditsky |
| 2003/0030764 A1 | 2/2003 | Lee |
| 2003/0034445 A1 | 2/2003 | Boyd et al. |
| 2003/0058069 A1 | 3/2003 | Schwartz et al. |
| 2003/0067760 A1 | 4/2003 | Jagt et al. |
| 2003/0071947 A1 | 4/2003 | Shiraogawa et al. |
| 2003/0081154 A1 | 5/2003 | Coleman |
| 2003/0083429 A1 | 5/2003 | Smith et al. |
| 2003/0086030 A1 | 5/2003 | Taniguchi et al. |
| 2003/0086031 A1 | 5/2003 | Taniguchi et al. |
| 2003/0095401 A1 | 5/2003 | Hanson et al. |
| 2003/0098957 A1 | 5/2003 | Haldiman |
| 2003/0099118 A1 | 5/2003 | Saitoh et al. |
| 2003/0103177 A1 | 6/2003 | Maeda |
| 2003/0103344 A1 | 6/2003 | Niida et al. |
| 2003/0123245 A1 | 7/2003 | Parker et al. |
| 2003/0161040 A1 | 8/2003 | Ishii et al. |
| 2003/0165067 A1 | 9/2003 | Imamura et al. |
| 2003/0169385 A1 | 9/2003 | Okuwaki |
| 2003/0184690 A1 | 10/2003 | Ogiwara et al. |
| 2003/0193630 A1 | 10/2003 | Chiou |
| 2003/0210222 A1 | 11/2003 | Ogiwara et al. |
| 2003/0210363 A1 | 11/2003 | Yasukawa et al. |
| 2003/0210367 A1 | 11/2003 | Nakano et al. |
| 2003/0222857 A1 | 12/2003 | Abileah |
| 2003/0231483 A1 | 12/2003 | Higashiyama |
| 2004/0001169 A1 | 1/2004 | Saiki et al. |
| 2004/0017599 A1 | 1/2004 | Yang |
| 2004/0027339 A1 | 2/2004 | Schulz |
| 2004/0032401 A1 | 2/2004 | Nakazawa et al. |
| 2004/0032659 A1 | 2/2004 | Drinkwater |
| 2004/0042233 A1 | 3/2004 | Suzuki et al. |
| 2004/0075994 A1 | 4/2004 | Kuo et al. |
| 2004/0085748 A1 | 5/2004 | Sugiura |
| 2004/0100796 A1 | 5/2004 | Ward |
| 2004/0109305 A1 | 6/2004 | Chisholm et al. |
| 2004/0125048 A1 | 7/2004 | Fukuda et al. |
| 2004/0135494 A1 | 7/2004 | Miyatake |
| 2004/0170373 A1 | 9/2004 | Kim |
| 2004/0174583 A1 | 9/2004 | Chen et al. |
| 2004/0188150 A1 | 9/2004 | Richard et al. |
| 2004/0188599 A1 | 9/2004 | Viktorovitch |
| 2004/0207995 A1 | 10/2004 | Park et al. |
| 2004/0217264 A1 | 11/2004 | Wood et al. |
| 2004/0228109 A1 | 11/2004 | Leu et al. |
| 2004/0228112 A1 | 11/2004 | Takata |
| 2004/0233357 A1 | 11/2004 | Fujimori et al. |
| 2004/0246743 A1 | 12/2004 | Lee |
| 2005/0002082 A1 | 1/2005 | Miles |
| 2005/0002175 A1 | 1/2005 | Matsui et al. |
| 2005/0010568 A1 | 1/2005 | Nagatomo et al. |
| 2005/0024849 A1 | 2/2005 | Parker et al. |
| 2005/0024890 A1 | 2/2005 | Yamamoto et al. |
| 2005/0030732 A1 | 2/2005 | Kimura et al. |
| 2005/0041175 A1 | 2/2005 | Akiyama et al. |
| 2005/0046011 A1 | 3/2005 | Chen et al. |
| 2005/0069254 A1 | 3/2005 | Schultheis et al. |
| 2005/0120553 A1 | 6/2005 | Brown et al. |
| 2005/0128190 A1 | 6/2005 | Ryynanen |
| 2005/0133761 A1 | 6/2005 | Thielemans |
| 2005/0141065 A1 | 6/2005 | Masamoto |
| 2005/0146897 A1 | 7/2005 | Mimura et al. |
| 2005/0185416 A1 | 8/2005 | Lee et al. |
| 2005/0195175 A1 | 9/2005 | Anderson |
| 2005/0206802 A1 | 9/2005 | Creemers |
| 2005/0207016 A1 | 9/2005 | Ando |
| 2005/0231977 A1 | 10/2005 | Hayakawa |
| 2005/0231981 A1 | 10/2005 | Hoelen et al. |
| 2005/0248524 A1 | 11/2005 | Feng et al. |
| 2005/0254771 A1 | 11/2005 | Yamashita et al. |
| 2005/0259939 A1 | 11/2005 | Rinko |
| 2005/0270798 A1 | 12/2005 | Lee et al. |
| 2005/0271325 A1 | 12/2005 | Anderson et al. |
| 2006/0001653 A1 | 1/2006 | Smits et al. |
| 2006/0002141 A1 | 1/2006 | Ouderkirk et al. |
| 2006/0002675 A1 | 1/2006 | Choi et al. |
| 2006/0024017 A1 | 2/2006 | Page et al. |
| 2006/0044523 A1 | 3/2006 | Teijido et al. |
| 2006/0050032 A1 | 3/2006 | Gunner et al. |
| 2006/0051048 A1 | 3/2006 | Gardiner et al. |
| 2006/0056166 A1 | 3/2006 | Yeo et al. |
| 2006/0061705 A1 | 3/2006 | Onishi |
| 2006/0062016 A1 | 3/2006 | Dejima et al. |
| 2006/0066586 A1 | 3/2006 | Gally |
| 2006/0067600 A1 | 3/2006 | Gally et al. |
| 2006/0072315 A1 | 4/2006 | Han et al. |
| 2006/0072339 A1 | 4/2006 | Li et al. |
| 2006/0083028 A1 | 4/2006 | Sun et al. |
| 2006/0109682 A1 | 5/2006 | Ko et al. |
| 2006/0110090 A1 | 5/2006 | Ellwood, Jr. |
| 2006/0114244 A1 | 6/2006 | Saxena et al. |
| 2006/0126142 A1 | 6/2006 | Choi |
| 2006/0132383 A1 | 6/2006 | Gally et al. |
| 2006/0164861 A1 | 7/2006 | Maeda et al. |
| 2006/0164863 A1 | 7/2006 | Chang et al. |
| 2006/0181866 A1 | 8/2006 | Jung et al. |
| 2006/0181903 A1 | 8/2006 | Okuwaki |
| 2006/0187676 A1 | 8/2006 | Ishikura |
| 2006/0209012 A1 | 9/2006 | Hagood |
| 2006/0209385 A1 | 9/2006 | Liu et al. |
| 2006/0215958 A1 | 9/2006 | Yeo et al. |
| 2006/0227532 A1 | 10/2006 | Ko et al. |
| 2006/0262562 A1 | 11/2006 | Fukasawa et al. |
| 2006/0265919 A1 | 11/2006 | Huang |
| 2006/0268574 A1 | 11/2006 | Jung et al. |
| 2006/0279558 A1 | 12/2006 | Van Delden et al. |
| 2006/0285356 A1 | 12/2006 | Tseng |
| 2006/0290684 A1 | 12/2006 | Giraldo et al. |
| 2006/0291769 A1 | 12/2006 | Spoonhower et al. |
| 2007/0018585 A1 | 1/2007 | Ijzerman et al. |
| 2007/0036492 A1 | 2/2007 | Lee |

(56) References Cited

U.S. PATENT DOCUMENTS

| | | |
|---|---|---|
| 2007/0064294 A1 | 3/2007 | Hoshino et al. |
| 2007/0070270 A1 | 3/2007 | Yu et al. |
| 2007/0081360 A1 | 4/2007 | Bailey et al. |
| 2007/0097694 A1 | 5/2007 | Faase et al. |
| 2007/0116424 A1 | 5/2007 | Ting et al. |
| 2007/0125415 A1 | 6/2007 | Sachs |
| 2007/0133226 A1 | 6/2007 | Mi |
| 2007/0133935 A1 | 6/2007 | Fine |
| 2007/0134438 A1 | 6/2007 | Fabick et al. |
| 2007/0147087 A1 | 6/2007 | Parker et al. |
| 2007/0171330 A1 | 7/2007 | Hung et al. |
| 2007/0171418 A1 | 7/2007 | Nyhart, Jr. |
| 2007/0177405 A1 | 8/2007 | Chan et al. |
| 2007/0187852 A1 | 8/2007 | Parker et al. |
| 2007/0189036 A1 | 8/2007 | Chen et al. |
| 2007/0201234 A1 | 8/2007 | Ottermann |
| 2007/0210163 A1 | 9/2007 | Han |
| 2007/0216992 A1 | 9/2007 | Tzeng et al. |
| 2007/0229737 A1 | 10/2007 | Takeda |
| 2007/0229936 A1 | 10/2007 | Miles |
| 2007/0241340 A1 | 10/2007 | Pan |
| 2007/0253717 A1 | 11/2007 | Charters et al. |
| 2007/0268695 A1 | 11/2007 | Seetzen |
| 2007/0279727 A1 | 12/2007 | Gandhi et al. |
| 2007/0279935 A1 | 12/2007 | Gardiner et al. |
| 2007/0285406 A1 | 12/2007 | Kukulj et al. |
| 2007/0291362 A1 | 12/2007 | Hill et al. |
| 2007/0292091 A1 | 12/2007 | Fujii et al. |
| 2008/0030650 A1 | 2/2008 | Kitagawa et al. |
| 2008/0042154 A1 | 2/2008 | Wano |
| 2008/0049445 A1 | 2/2008 | Harbers et al. |
| 2008/0074402 A1 | 3/2008 | Cornish et al. |
| 2008/0079687 A1 | 4/2008 | Cernasov |
| 2008/0084600 A1 | 4/2008 | Bita et al. |
| 2008/0090025 A1 | 4/2008 | Freking et al. |
| 2008/0094853 A1 | 4/2008 | Kim et al. |
| 2008/0105908 A1 | 5/2008 | Lee |
| 2008/0112039 A1 | 5/2008 | Chui et al. |
| 2008/0137175 A1 | 6/2008 | Lin |
| 2008/0137373 A1 | 6/2008 | Li |
| 2008/0151347 A1 | 6/2008 | Chui et al. |
| 2008/0170414 A1 | 7/2008 | Wang |
| 2008/0192484 A1 | 8/2008 | Lee et al. |
| 2008/0232135 A1 | 9/2008 | Kinder et al. |
| 2008/0239216 A1 | 10/2008 | Miyamoto et al. |
| 2008/0266333 A1 | 10/2008 | Silverstein et al. |
| 2008/0278460 A1 | 11/2008 | Arnett et al. |
| 2008/0285307 A1 | 11/2008 | Aylward et al. |
| 2009/0050454 A1 | 2/2009 | Matsukawa et al. |
| 2009/0086466 A1 | 4/2009 | Sugita et al. |
| 2009/0090611 A1 | 4/2009 | Zeijlon et al. |
| 2009/0096956 A1 | 4/2009 | Uehara et al. |
| 2009/0101623 A1 | 4/2009 | Bita et al. |
| 2009/0103166 A1 | 4/2009 | Khazeni et al. |
| 2009/0126777 A1 | 5/2009 | Khazeni et al. |
| 2009/0126792 A1 | 5/2009 | Gruhlke et al. |
| 2009/0135469 A1 | 5/2009 | Lee et al. |
| 2009/0141476 A1 | 6/2009 | Meir et al. |
| 2009/0147535 A1 | 6/2009 | Mienko et al. |
| 2009/0168459 A1 | 7/2009 | Holman et al. |
| 2009/0190373 A1 | 7/2009 | Bita et al. |
| 2009/0196068 A1 | 8/2009 | Wang et al. |
| 2009/0199893 A1 | 8/2009 | Bita et al. |
| 2009/0199900 A1 | 8/2009 | Bita et al. |
| 2009/0201301 A1 | 8/2009 | Mienko et al. |
| 2009/0201565 A1* | 8/2009 | Bita et al. ............ 359/290 |
| 2009/0231877 A1 | 9/2009 | Mienko et al. |
| 2009/0251752 A1 | 10/2009 | Gruhlke |
| 2009/0251783 A1 | 10/2009 | Huibers et al. |
| 2009/0255569 A1 | 10/2009 | Sampsell et al. |
| 2009/0257108 A1 | 10/2009 | Gruhlke et al. |
| 2009/0296193 A1 | 12/2009 | Bita et al. |
| 2009/0296194 A1 | 12/2009 | Gally et al. |
| 2009/0303417 A1 | 12/2009 | Mizushima et al. |
| 2009/0303746 A1 | 12/2009 | Wang et al. |
| 2009/0319220 A1 | 12/2009 | Khazeni |
| 2009/0320899 A1 | 12/2009 | Schiavoni et al. |
| 2009/0323144 A1 | 12/2009 | Gruhlke |
| 2009/0323153 A1 | 12/2009 | Sampsell |
| 2010/0026727 A1 | 2/2010 | Bita et al. |
| 2010/0033988 A1 | 2/2010 | Chiu et al. |
| 2010/0051089 A1 | 3/2010 | Khazeni et al. |
| 2010/0052880 A1 | 3/2010 | Laitinen et al. |
| 2010/0053148 A1 | 3/2010 | Khazeni et al. |
| 2010/0103488 A1 | 4/2010 | Gruhlke et al. |
| 2010/0141557 A1 | 6/2010 | Gruhlke et al. |
| 2010/0149624 A1 | 6/2010 | Kothari |
| 2010/0157406 A1 | 6/2010 | Gruhlke et al. |
| 2010/0172012 A1 | 7/2010 | Sampsell |
| 2010/0177533 A1 | 7/2010 | Griffiths et al. |
| 2010/0182308 A1 | 7/2010 | Holman et al. |
| 2010/0188367 A1 | 7/2010 | Nagafuji et al. |
| 2010/0220261 A1 | 9/2010 | Mizushima et al. |
| 2010/0238529 A1 | 9/2010 | Sampsell et al. |
| 2010/0302802 A1 | 12/2010 | Bita et al. |
| 2010/0321339 A1 | 12/2010 | Kimmel |
| 2011/0025620 A1 | 2/2011 | Jakobsen et al. |
| 2011/0025727 A1 | 2/2011 | Li et al. |
| 2011/0032214 A1 | 2/2011 | Gruhlke et al. |
| 2011/0122071 A1 | 5/2011 | Powell |
| 2012/0026576 A1 | 2/2012 | Bita et al. |
| 2012/0069031 A1 | 3/2012 | Bita et al. |
| 2012/0154881 A1 | 6/2012 | Gruhlke et al. |
| 2013/0106918 A1 | 5/2013 | Bita et al. |

FOREIGN PATENT DOCUMENTS

| | | |
|---|---|---|
| CN | 1286424 | 3/2001 |
| CN | 1381752 A | 11/2002 |
| CN | 1384392 A | 12/2002 |
| CN | 1447887 A | 10/2003 |
| CN | 1517760 A | 8/2004 |
| CN | 1517776 A | 8/2004 |
| CN | 1559000 A | 12/2004 |
| CN | 1639596 | 7/2005 |
| CN | 1643439 A | 7/2005 |
| CN | 1670593 A | 9/2005 |
| CN | 1795403 | 6/2006 |
| CN | 1811549 A | 8/2006 |
| CN | 101149445 A | 3/2008 |
| CN | 101226259 A | 7/2008 |
| DE | 34 02 746 | 8/1985 |
| DE | 19622748 | 12/1997 |
| DE | 19942513 A1 | 3/2001 |
| DE | 10228946 A1 | 1/2004 |
| DE | 102007025092 A1 | 12/2008 |
| EP | 0278038 A1 | 8/1988 |
| EP | 0 389 031 | 9/1990 |
| EP | 0539099 A2 | 4/1993 |
| EP | 0590511 A1 | 4/1994 |
| EP | 0621500 A1 | 10/1994 |
| EP | 0822441 A2 | 2/1998 |
| EP | 0879991 A2 | 11/1998 |
| EP | 0907050 A1 | 4/1999 |
| EP | 0957392 A1 | 11/1999 |
| EP | 0984314 A2 | 3/2000 |
| EP | 1081633 A2 | 3/2001 |
| EP | 1089115 A1 | 4/2001 |
| EP | 1093105 A1 | 4/2001 |
| EP | 1113218 A1 | 7/2001 |
| EP | 1116987 A2 | 7/2001 |
| EP | 1122586 A2 | 8/2001 |
| EP | 1127984 A1 | 8/2001 |
| EP | 1143270 A1 | 10/2001 |
| EP | 1199512 A1 | 4/2002 |
| EP | 1251454 A2 | 10/2002 |
| EP | 1271223 A2 | 1/2003 |
| EP | 1279892 A1 | 1/2003 |
| EP | 1296094 A1 | 3/2003 |
| EP | 1306609 A1 | 5/2003 |
| EP | 1329664 A1 | 7/2003 |
| EP | 1336876 A1 | 8/2003 |
| EP | 1347315 A1 | 9/2003 |
| EP | 1389775 A2 | 2/2004 |

(56) References Cited

FOREIGN PATENT DOCUMENTS

| | | |
|---|---|---|
| EP | 1413543 A1 | 4/2004 |
| EP | 1437610 A1 | 7/2004 |
| EP | 1445629 A1 | 8/2004 |
| EP | 1519218 A1 | 3/2005 |
| EP | 1531302 A1 | 5/2005 |
| EP | 1544537 A1 | 6/2005 |
| EP | 1577701 A1 | 9/2005 |
| EP | 1698918 A1 | 9/2006 |
| EP | 1 734 401 | 12/2006 |
| EP | 1732141 | 12/2006 |
| EP | 1748305 A1 | 1/2007 |
| EP | 1762778 A1 | 3/2007 |
| EP | 1832806 A1 | 9/2007 |
| EP | 1862730 A1 | 12/2007 |
| EP | 1870635 A2 | 12/2007 |
| FR | 2889597 | 2/2007 |
| GB | 2 260 203 | 4/1993 |
| GB | 2278222 | 11/1994 |
| GB | 2315356 A | 1/1998 |
| GB | 2331615 | 5/1999 |
| GB | 2336933 | 11/1999 |
| GB | 2340281 | 2/2000 |
| GB | 2351834 A | 1/2001 |
| JP | 60242408 A | 12/1985 |
| JP | 62009317 | 1/1987 |
| JP | 4053220 A | 2/1992 |
| JP | 04081816 | 3/1992 |
| JP | 05 281479 | 10/1993 |
| JP | 07 509327 | 10/1995 |
| JP | 8271874 A | 10/1996 |
| JP | 09 005735 | 1/1997 |
| JP | 09022012 | 1/1997 |
| JP | 09160032 | 6/1997 |
| JP | H09178949 A | 7/1997 |
| JP | 09 507920 | 8/1997 |
| JP | 09307140 | 11/1997 |
| JP | 09311333 | 12/1997 |
| JP | 10202948 | 8/1998 |
| JP | 10268307 A | 10/1998 |
| JP | 11160687 | 6/1999 |
| JP | 11167808 A | 6/1999 |
| JP | 11174234 | 7/1999 |
| JP | 11184387 A | 7/1999 |
| JP | 11 211999 | 8/1999 |
| JP | 11231321 A | 8/1999 |
| JP | 11232919 | 8/1999 |
| JP | 11326903 A | 11/1999 |
| JP | 2000028933 A | 1/2000 |
| JP | 2000075293 A | 3/2000 |
| JP | 2000081848 | 3/2000 |
| JP | 2000089225 A | 3/2000 |
| JP | 2000147262 A | 5/2000 |
| JP | 2000181367 | 6/2000 |
| JP | 2000193933 A | 7/2000 |
| JP | 2000214804 A | 8/2000 |
| JP | 2000514568 | 10/2000 |
| JP | 2000305074 | 11/2000 |
| JP | 2000338310 A | 12/2000 |
| JP | 2001021883 | 1/2001 |
| JP | 2001 305312 | 10/2001 |
| JP | 2001283622 A | 10/2001 |
| JP | 2001297615 A | 10/2001 |
| JP | 2001343514 | 12/2001 |
| JP | 2002-090549 | 3/2002 |
| JP | 2002072284 A | 3/2002 |
| JP | 2002098838 A | 4/2002 |
| JP | 2002108227 | 4/2002 |
| JP | 2002124113 A | 4/2002 |
| JP | 2002131551 A | 5/2002 |
| JP | 2002174732 A | 6/2002 |
| JP | 2002174780 | 6/2002 |
| JP | 2002196151 A | 7/2002 |
| JP | 2002236290 A | 8/2002 |
| JP | 2002245835 A | 8/2002 |
| JP | 2002 297044 | 10/2002 |
| JP | 2002287047 A | 10/2002 |
| JP | 2002365438 A | 12/2002 |
| JP | 2003007114 A | 1/2003 |
| JP | 2003 057652 | 2/2003 |
| JP | 2003057653 A | 2/2003 |
| JP | 2003066451 | 3/2003 |
| JP | 2003149642 | 5/2003 |
| JP | 2003149643 | 5/2003 |
| JP | 2003173713 A | 6/2003 |
| JP | 2003177336 A | 6/2003 |
| JP | 2003177405 A | 6/2003 |
| JP | 2003188959 A | 7/2003 |
| JP | 2003315694 A | 11/2003 |
| JP | 2003344881 | 12/2003 |
| JP | 2004 012918 | 1/2004 |
| JP | 2004 062099 | 2/2004 |
| JP | 2004 510185 | 4/2004 |
| JP | 2004 206049 | 7/2004 |
| JP | 2005259365 | 9/2005 |
| JP | 2005316178 | 11/2005 |
| JP | 2006039056 A | 2/2006 |
| JP | 2006065360 A | 3/2006 |
| JP | 2006107993 | 4/2006 |
| JP | 2006120571 | 5/2006 |
| JP | 2007027150 A | 2/2007 |
| JP | 2007218540 A | 8/2007 |
| JP | 2008103110 A | 5/2008 |
| JP | 2009300966 A | 12/2009 |
| TW | 552720 | 9/2003 |
| TW | 567388 B | 12/2003 |
| TW | 579368 | 3/2004 |
| WO | WO-9406871 A1 | 3/1994 |
| WO | WO 95/01584 | 1/1995 |
| WO | WO 95/14256 | 5/1995 |
| WO | WO-9515582 A1 | 6/1995 |
| WO | WO-9616348 A1 | 5/1996 |
| WO | WO 97/01240 | 1/1997 |
| WO | WO-9716756 A1 | 5/1997 |
| WO | WO-9746908 A1 | 12/1997 |
| WO | WO-9819201 A1 | 5/1998 |
| WO | WO 98/32047 | 7/1998 |
| WO | WO 98/35182 | 8/1998 |
| WO | WO-9904296 A1 | 1/1999 |
| WO | WO-9963394 A1 | 12/1999 |
| WO | WO-9964785 A1 | 12/1999 |
| WO | WO 00/50807 | 8/2000 |
| WO | WO-0129148 A1 | 4/2001 |
| WO | WO-0157434 A1 | 8/2001 |
| WO | WO-0181994 A1 | 11/2001 |
| WO | WO-0184228 A1 | 11/2001 |
| WO | WO-0184229 A1 | 11/2001 |
| WO | WO-0190637 A1 | 11/2001 |
| WO | WO 02/06858 | 1/2002 |
| WO | WO-0235145 A1 | 5/2002 |
| WO | WO-02071132 A2 | 9/2002 |
| WO | WO-02097324 A1 | 12/2002 |
| WO | WO-03032058 A1 | 4/2003 |
| WO | WO 03/038509 | 5/2003 |
| WO | WO-03062912 A1 | 7/2003 |
| WO | WO-03075207 A2 | 9/2003 |
| WO | WO-2004003643 A1 | 1/2004 |
| WO | WO-2004015489 A1 | 2/2004 |
| WO | WO 2004/036270 | 4/2004 |
| WO | WO-2004027514 A2 | 4/2004 |
| WO | WO-2004088372 A1 | 10/2004 |
| WO | WO-2004114418 A1 | 12/2004 |
| WO | WO-2005011012 A1 | 2/2005 |
| WO | WO-2005088367 A1 | 9/2005 |
| WO | WO-2005111669 A1 | 11/2005 |
| WO | WO-2006008702 A2 | 1/2006 |
| WO | WO-2006036451 A1 | 4/2006 |
| WO | WO-2006036496 | 4/2006 |
| WO | WO-2007064133 A1 | 6/2007 |
| WO | WO-2007073203 A1 | 6/2007 |
| WO | WO-2007074787 A1 | 7/2007 |
| WO | WO-2007094558 A1 | 8/2007 |
| WO | WO 2008/045462 | 4/2008 |
| WO | WO-2008038754 A1 | 4/2008 |
| WO | WO-2008045311 A2 | 4/2008 |

(56) References Cited

FOREIGN PATENT DOCUMENTS

| WO | WO-2008045364 A2 | 4/2008 |
|---|---|---|
| WO | WO-2008045463 | 4/2008 |
| WO | WO-2008099989 A1 | 8/2008 |
| WO | WO-2008145096 A1 | 12/2008 |
| WO | WO-2009011922 A1 | 1/2009 |
| WO | WO-2010073047 A1 | 7/2010 |
| WO | WO-2010119426 A2 | 10/2010 |

OTHER PUBLICATIONS

International Preliminary Report on Patentability and Written Opinion in International Application No. PCT/US2011/064482 mailed Jun. 18, 2013.
Application as filed in U.S. Appl. No. 13/307,353, dated Nov. 30, 2011.
Fan, et al., "Channel Drop Filters in Photonic Crystals," Optics Express, 1998, vol. 3(1), pp. 4-11.
Giles, et al., "A Silicon Mems Optical Switch Attenuator And its Use In Lightwave Subsystems," IEEE Journal of Selected Topics in Quantum Electronics, 1999, 5 (1), 18-25.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Huang et al. "Virtual Touch 3D Interactive System for Auto-Stereoscopic Displaywith Embedded Optical Sensor," Proc. of SPIE, 2011, vol. 8043, pp. 18.
Imenes, et al., "Spectral Beam Splitting Technology for Increased Conversion Efficiency In Solar Concentrating Systems a Review," Solar Energy Materials, Elsevier Science, Publishers B.V. Amsterdam, NL, Oct. 1, 2004, vol. 84, pp. 19-69, XP002474546.
Little, et al., "Vertically Coupled Glass Microring Resonator Channel Dropping Filters," IEEE Photonics Technology Letters, Feb. 1999, 11(2), 215-217.
Maeda, et al., "A Study of A High Quality Front Lighting System for Reflective Full-Color Liquid Crystal Displays," Record of Electrical and Communication, Engineering Conversazione Tohoku University, Sep. 2009, v 78(1), 415-416, ISSN: 0385-7719.
Magel G.A., "Integrated Optic Devices using Micromachined Metal Membranes," SPIE, 1996, vol. 2686, 54-63.
Mehregany, et al., "MEMS Applications in Optical Systems," IEEE/LEOS 1996 Summer Topical Meetings, 1996, 75-76.
Miles M., et al., "Digital Paper (TM) for reflective displays", Journal of the Society for Information Display, Society for Information Display, Vol. 11 (1), pp. 209-215, 2003, XP002358929, ISSN: 1071-0922.
Neal T.D. et al., "Surface Plasmon Enhanced Emission From Dye Doped Polymer Layers," Optics Express Opt. Soc. America, USA, Jul. 11, 2005, vol. 13(14), 5522-5527.
Obi et al., "Fabrication of Optical Mems in Sol/Gel Materials," IEEE/LEOS International Conference on Optical Mems, 2002, Conference Digest, pp. 39-40.
Oliner, "Radiating Elements and Mutual Coupling," Microwave Scanning Antennas, 1966, vol. 2, 131-157 and pp.190-194.
Zhou et al., "Waveguide Panel Display Using Electromechanism Spatial Modulators," SID Digest, 1998, vol. XXIX.

* cited by examiner

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

HOLOGRAPHIC BRIGHTNESS ENHANCEMENT FILM

TECHNICAL FIELD

This disclosure relates to electromechanical systems including display systems, methods and apparatus utilizing a holographic film to turn light incident on a display.

DESCRIPTION OF THE RELATED TECHNOLOGY

Electromechanical systems include devices having electrical and mechanical elements, actuators, transducers, sensors, optical components (e.g., minors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Reflected ambient light can be used to form images in some display devices, such as those using pixels formed by interferometric modulators. The perceived brightness of these displays depends upon the amount of light that is reflected towards a viewer. In low ambient light conditions, light from an artificial light source can be used to illuminate the reflective pixels, which then reflects the light towards a viewer to generate an image. New illumination devices are continually being developed to meet the needs of display devices, including reflective and transmissive displays.

SUMMARY

The systems, methods and devices of the disclosure each have several innovative aspects, no single one of which is solely responsible for the desirable attributes disclosed herein.

One innovative aspect of the subject matter described in this disclosure can be implemented in a display device. The display device includes an array of display elements; and a holographic film overlying the display elements. The holographic film includes a hologram, which is configured to turn light incident on the holographic film towards the array of display elements such that the turned light is reflected and propagates away from the display device at angles within a view cone. The incident light is incident on the holographic film at angles outside of the view cone. The hologram can be pixilated. Different pluralities of the pixels of the hologram can be configured to turn light incident on the hologram from different directions. Different pluralities of the pixels of the hologram also can be configured to turn light of different colors. The pixels can be biased to turn light of one or more particular colors relative to other colors.

Another implementation includes a display device with a first means for reflecting incident light outward from an image-displaying side of the display system to form a displayed image. A second means is provided for turning light incident on the display device towards the first means such that the turned light is reflected from the first means and the reflected turned light propagates away from the display device at angles within a view cone. The light is incident on the second means at angles outside of the view cone.

In yet another implementation, a method for manufacturing a display device is provided. The method includes providing a display having a reflective layer, and providing a holographic film on the display. The holographic film includes a hologram configured to turn light incident on the display device towards the reflective layer such that the turned light is reflected off the reflective layer and the reflected turned light propagates away from the display device at angles within a view cone. The light is incident on the holographic film at angles outside of the view cone.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
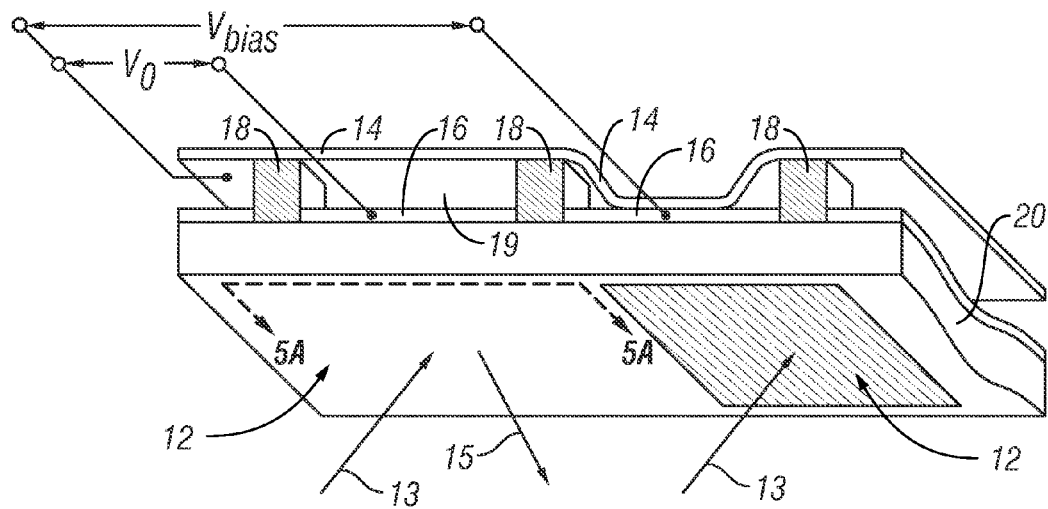
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

In some implementations, a display device having reflective display elements is provided. A holographic film is disposed over the display elements. The holographic film has a hologram that is configured to turn light, which is incident on the film at angles outside of a view cone, so that the light is reflected and propagates outward from an image-displaying side of the display towards the viewer at angles within the view cone. It will be appreciated that light (so-called "non-useful" light) that is incident on a display at angles outside of a view cone is typically also reflected at angles outside of the view cone. The hologram allows this non-useful light to be reflected within the view cone, thereby increasing the brightness of the display.

In some implementations, the hologram can be pixilated. Some of these hologram pixels can have properties that differ from other hologram pixels. For example, different pixels can be configured to turn light from different directions and/or light of different wavelengths or colors.

Particular implementations of the subject matter described in this disclosure can be implemented to realize one or more of the following potential advantages. Various implementations disclosed herein can increase the amount of light captured and reflected from a display towards a viewer. In addition, the hologram disposed on the display can be configured to efficiently turn light incident on the display device from a plurality of different directions and/or the color balance of the display can be adjusted by turning light of desired wavelengths.

One example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
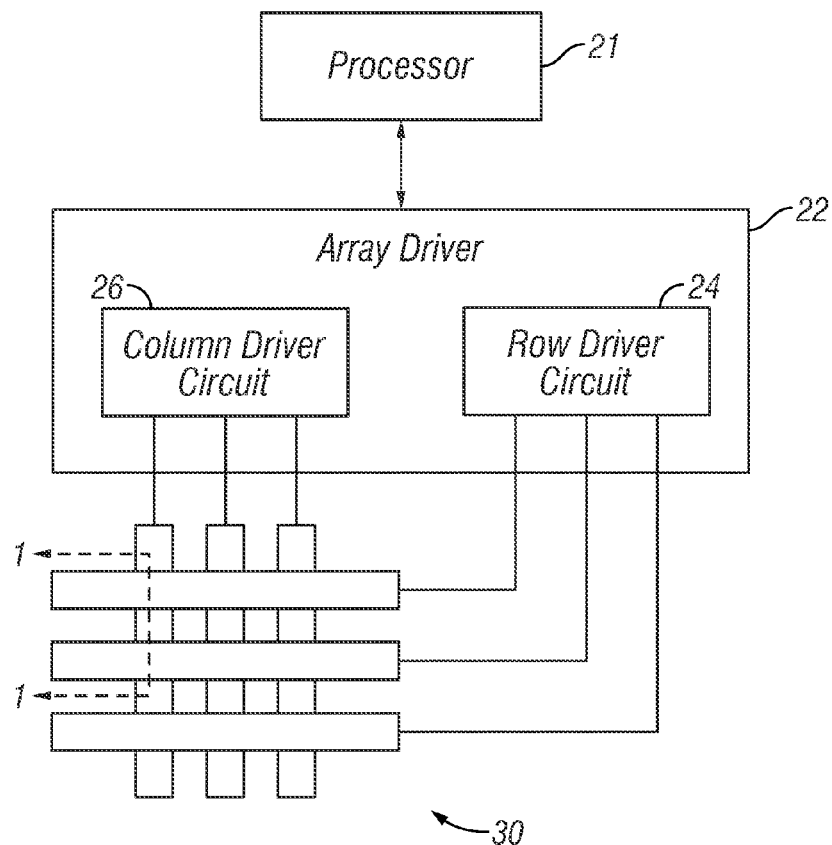
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3A, 3B:
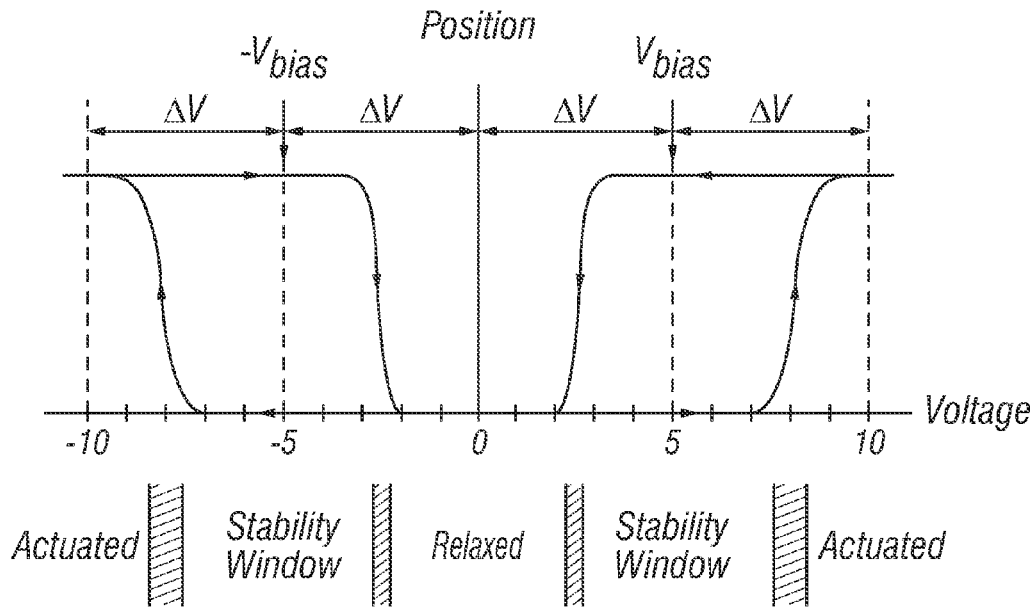
FIG. 3A shows an example of a diagram illustrating movable reflective layer position versus applied voltage for the interferometric modulator of FIG. 1.
FIG. 3B shows an example of a table illustrating various states of an interferometric modulator when various common and segment voltages are applied.

FIG. 3A shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3A. An interferometric modulator may require, for example, about a 10-volt potential difference to cause the movable reflective layer, or minor, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3A, exists where there is a window of applied voltage within which the device is stable in either the relaxed or actuated state. This is referred to herein as the "hysteresis window" or "stability window." For a display array 30 having the hysteresis characteristics of FIG. 3A, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 3B shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 3B (as well as in the timing diagram shown in FIG. 4B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3A, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 4A:
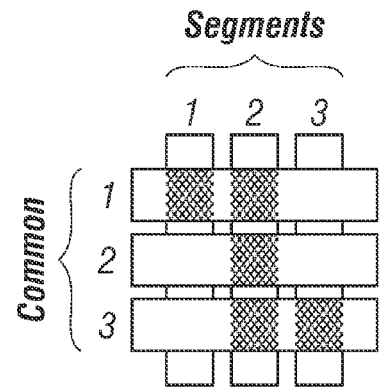
FIG. 4A shows an example of a diagram illustrating a frame of display data in the 3×3 interferometric modulator display of FIG. 2.
Figure 4B:
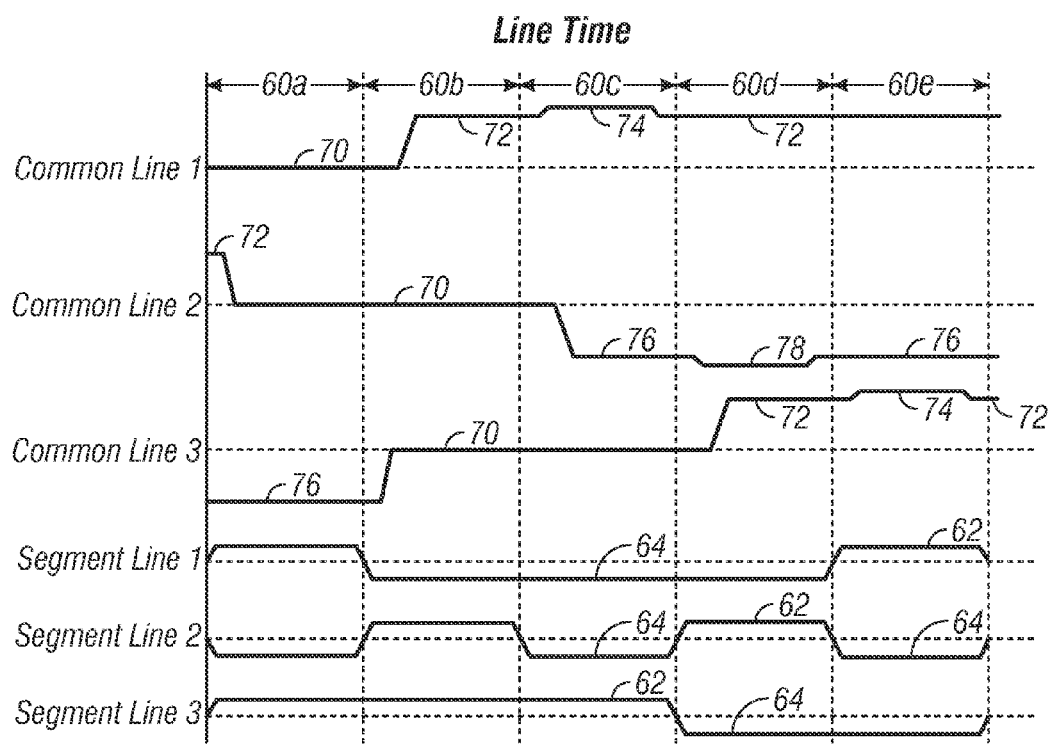
FIG. 4B shows an example of a timing diagram for common and segment signals that may be used to write the frame of display data illustrated in FIG. 4A.

FIG. 4A shows an example of a diagram illustrating a frame of display data in the 3×3 interferometric modulator display of FIG. 2. FIG. 4B shows an example of a timing diagram for common and segment signals that may be used to write the frame of display data illustrated in FIG. 4A. The signals can be applied to the, e.g., 3×3 array of FIG. 2, which will ultimately result in the line time 60e display arrangement illustrated in FIG. 4A. The actuated modulators in FIG. 4A are in a dark-state, i.e., where a substantial portion of the reflected light is outside of the visible spectrum so as to result in a dark appearance to, e.g., a viewer. Prior to writing the frame illustrated in FIG. 4A, the pixels can be in any state, but the write procedure illustrated in the timing diagram of FIG. 4B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 3B, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In the timing diagram of FIG. 4B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 4B. In some other implementations, voltages applied along common lines or segment lines may vary to account for variations in the actuation and release voltages of different modulators, such as modulators of different colors.

Figure 5A:
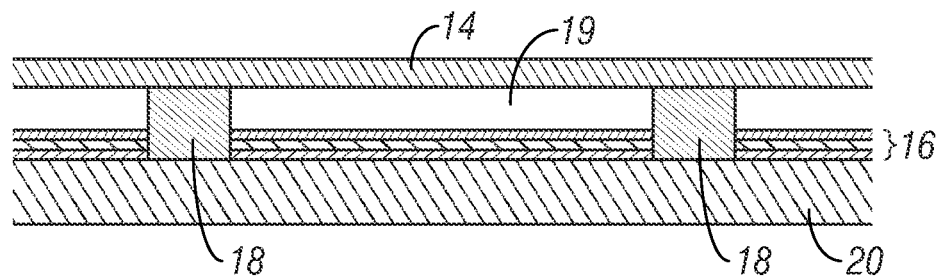
FIG. 5A shows an example of a partial cross-section of the interferometric modulator display of FIG. 1.
Figure 5B:
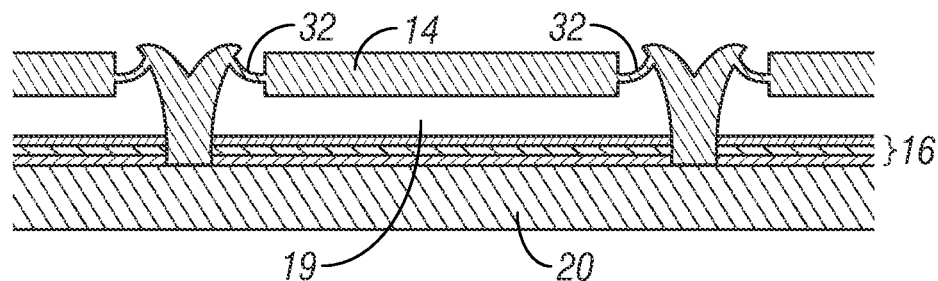
FIGS. 5B-5E show examples of cross-sections of varying implementations of interferometric modulators.
Figure 5C:
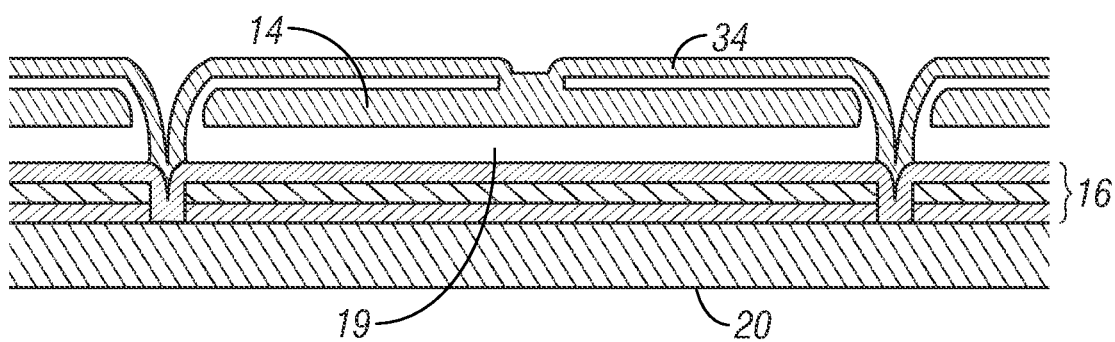

The details of the structure of interferometric modulators that operate in accordance with the principles set forth above may vary widely. For example, FIGS. 5A-5E show examples of cross-sections of varying implementations of interferometric modulators, including the movable reflective layer 14 and its supporting structures. FIG. 5A shows an example of a partial cross-section of the interferometric modulator display of FIG. 1, where a strip of metal material, i.e., the movable reflective layer 14 is deposited on supports 18 extending orthogonally from the substrate 20. In FIG. 5B, the movable reflective layer 14 of each IMOD is generally square or rectangular in shape and attached to supports at or near the corners, on tethers 32. In FIG. 5C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 5C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 5D:
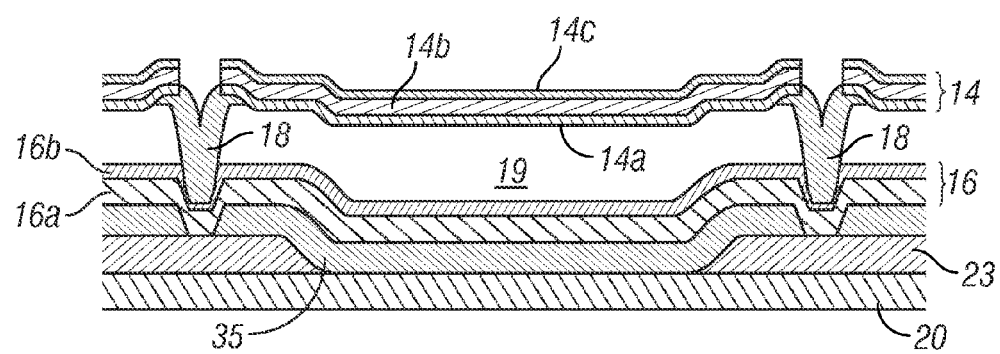

FIG. 5D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide (SiO$_2$). In some implementations, the support layer 14b can be a stack of layers, such as, for example, a SiO$_2$/SiON/SiO$_2$ tri-layer stack. Either or both of the reflective sub-layer 14a and the conductive layer 14c can include, e.g., an Al alloy with about 0.5% Cu, or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 5D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a SiO$_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, CF$_4$ and/or O$_2$ for the MoCr and SiO$_2$ layers and Cl$_2$ and/or BCl$_3$ for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 5E:
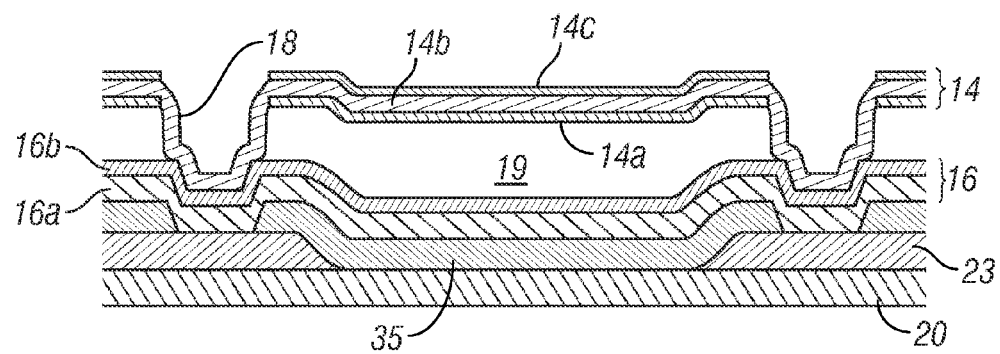

FIG. 5E shows another example of an IMOD, where the movable reflective layer 14 is self supporting. In contrast with FIG. 5D, the implementation of FIG. 5E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 5E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 5A-5E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 5C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 5A-5E can simplify processing, such as, e.g., patterning.

Figure 6:
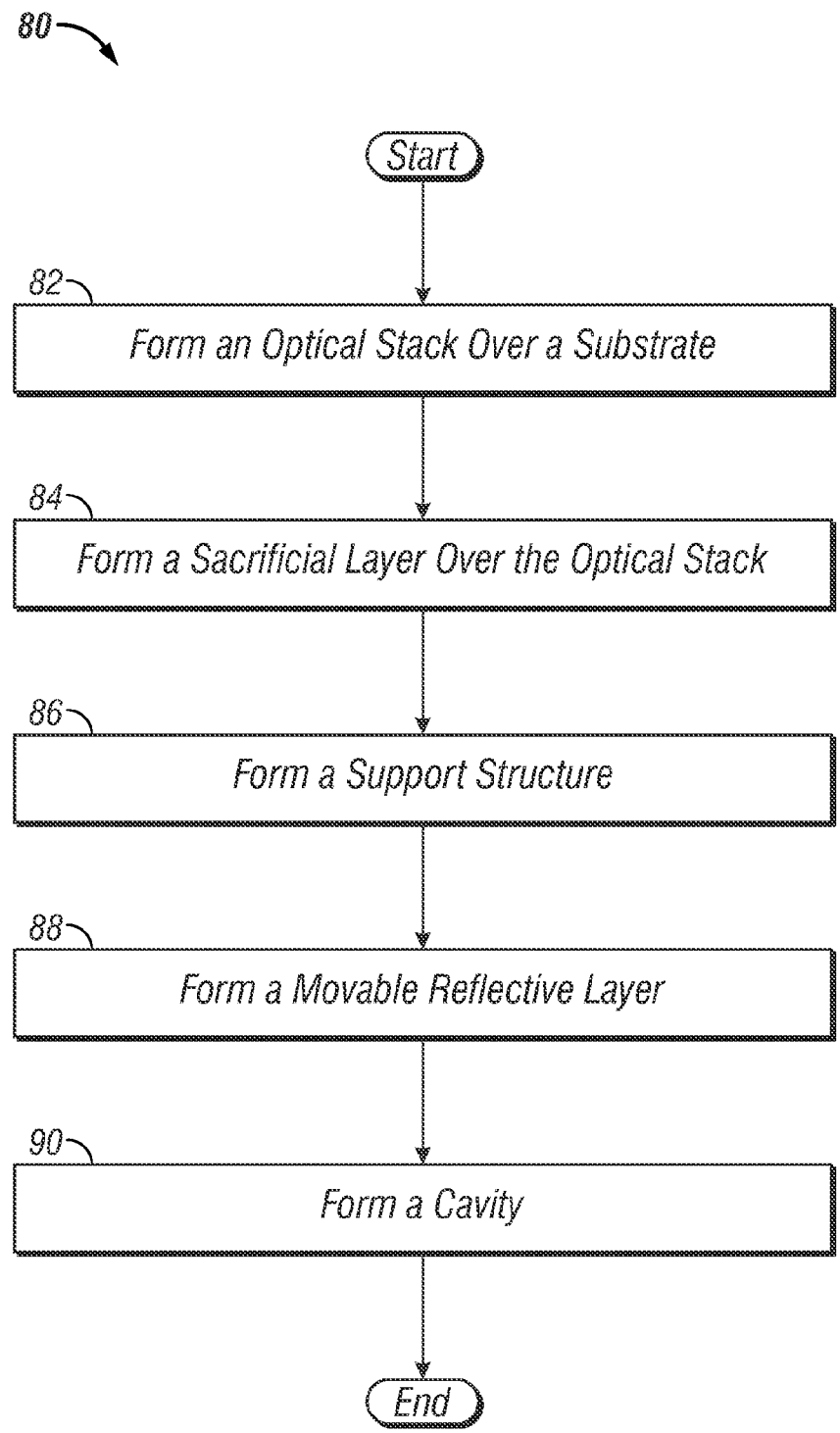
FIG. 6 shows an example of a flow diagram illustrating a manufacturing process for an interferometric modulator.
Figure 7A:
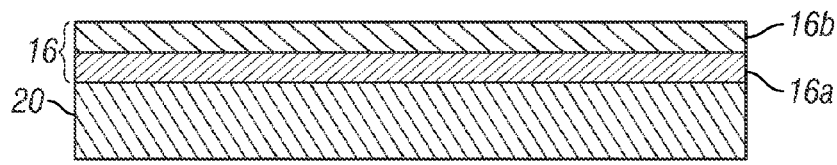
FIGS. 7A-7E show examples of cross-sectional schematic illustrations of various stages in a method of making an interferometric modulator.

FIG. 6 shows an example of a flow diagram illustrating a manufacturing process 80 for an interferometric modulator, and FIGS. 7A-7E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 5, in addition to other blocks not shown in FIG. 6. With reference to FIGS. 1, 5 and 6, the process 80 begins at block 82 with the formation of the optical stack 16 over the substrate 20. FIG. 7A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 7A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 7B:
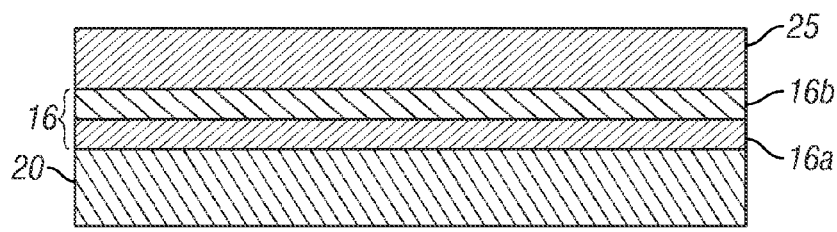

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 7B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 7E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 7C:
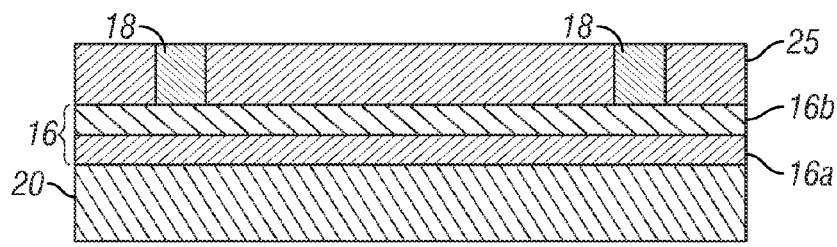

The process 80 continues at block 86 with the formation of a support structure e.g., a post 18 as illustrated in FIGS. 1, 5 and 7C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 5A. Alternatively, as depicted in FIG. 7C, the aperture formed in the sacrificial layer 25 can extend through the sacrificial layer 25, but not through the optical stack 16. For example, FIG. 7E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 7C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 7D:
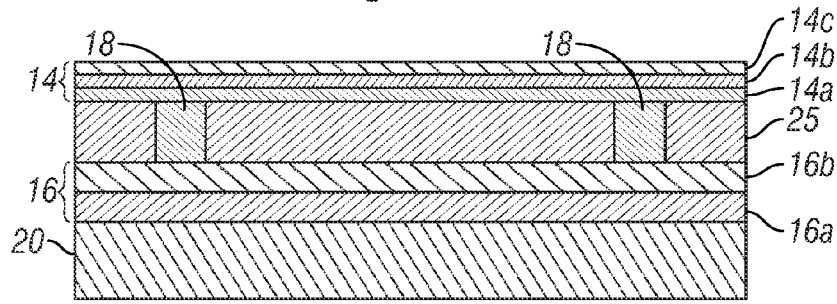
Figure 7E:
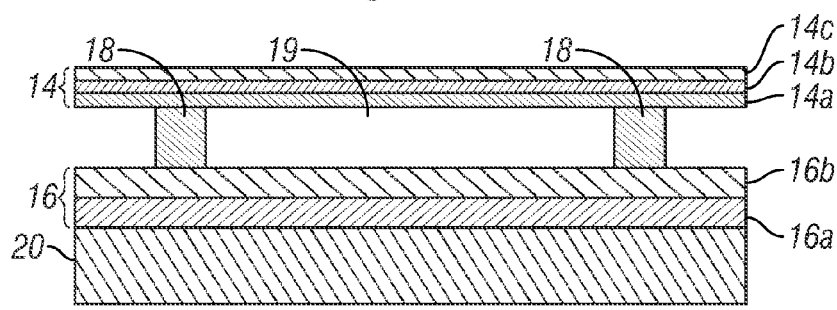

The process 80 continues at block 88 with the formation of a movable reflective layer or membrane such as the movable reflective layer 14 illustrated in FIGS. 1, 5 and 7D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 7D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 5 and 7E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 8:
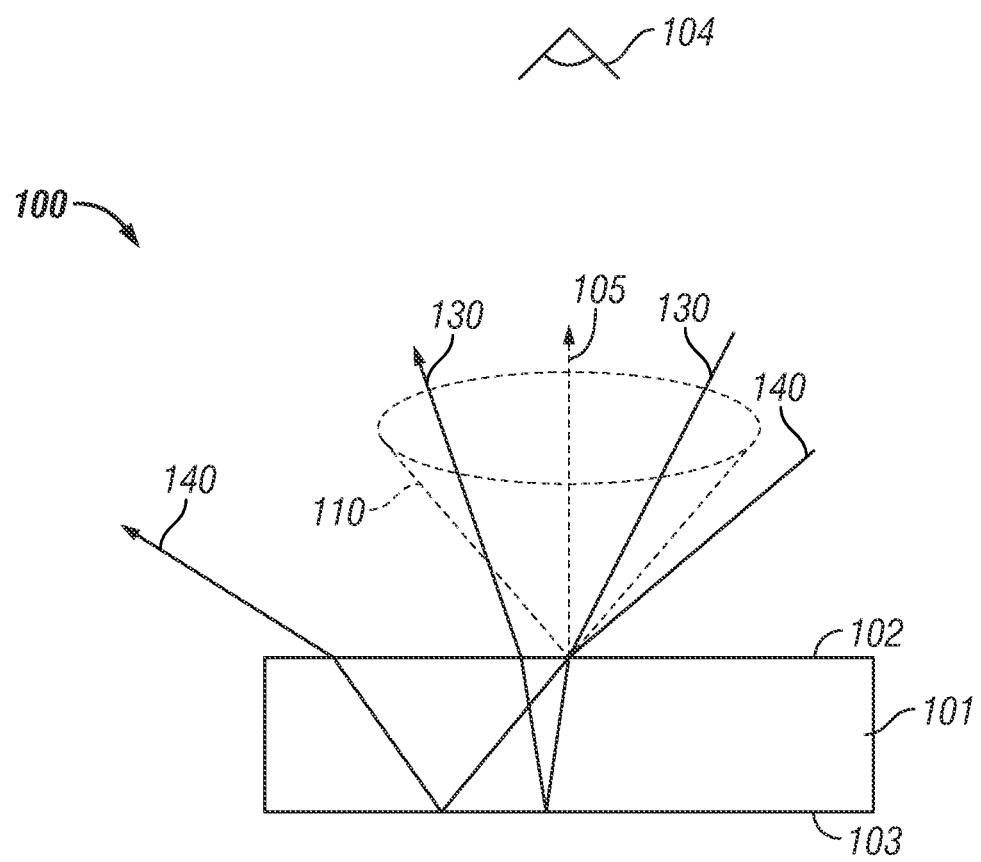
FIGS. 8 and 9 show examples of cross sections of a portion of a display.

With reference to FIG. 8, an example of a cross section of a portion of a display 100 is schematically illustrated. The display 100 has a body 101, a major surface 102 and a reflective surface 103. The body 101 is transmissive to desired wavelengths of radiation, e.g., wavelengths of light in the visible spectrum, and may be a transparent substrate such as the substrate 20 in, e.g., FIG. 1. In some implementations, the body 101 can be discontinuous, e.g., have gaps, and/or may be formed of multiple layers of material.

The major surface 102 faces a viewer 104 and is typically flat, as illustrated. In use, the viewer 104 typically perceives an image as being displayed on the major surface 102, although the display elements forming the image may be below the surface 102.

The reflective surface 103 is configured to reflect light out of the body 101 towards the viewer 104. This reflective surface 103 may be continuous or discontinuous. The reflective surface 103 may be formed of a continuous layer of material, or may be a part of devices such as interferometric modulators. For example, the surface 103 may include reflective layer 14 of interferometric modulators 12 in, e.g., FIG. 1.

The display 100, whether having display elements formed of interferometric modulators or other devices, has a range of viewing directions within which display performance can be specified as acceptable. This range of directions is referred to as a view cone 110. The image can be unacceptably distorted or can contain an unacceptable number of artifacts when viewed from directions outside of the view cone 110. In addition, interferometric modulators 12 have posts 18, which can cause shadows and can block light at some viewing angles, thereby causing non-uniformities across the display 100.

In some implementations, the view cone 110 includes viewing directions within about ±60°, about ±45°, about ±30°, about ±25°, about ±15°, about ±10°, or about ±5° of an axis 105 extending out from the major surface 102 of the display. Larger angles for the view cone 110 may allow for a larger range of viewing angles for a viewer, and smaller viewer angles may allow for a greater apparent brightness, since light from many different directions can be focused within a relatively small view cone 110. As illustrated, this axis 105 can be configured normal to the major surface 102. In some other arrangements, however, the view cone 110 may be centered on an axis (not shown) that is tilted relative to the normal.

As illustrated, the view cone 110 may be in the shape of a symmetrical cone having a boundary that extends at an angle of about ±60°, about ±45°, about ±30°, about ±25°, about ±15°, about ±10°, or about ±5° relative to the normal. The view cone 110 can have a tip at the intersection point of the normal 105 and the major surface 102 and can be rotated, at an angle of about ±60°, or about ±45°, about the axis 105 defined by the normal. It will be appreciated that, even within the view cone 110, the image quality may vary somewhat depending upon viewing direction; there may be a subset of viewing directions with which superior image quality is observed.

With continued reference to FIG. 8, the display 100 uses reflected light to produce an image. The reflected light that is directed towards a viewer 104 within the view cone 110 can determine the perceived brightness of the display 100. Thus, some of the light striking the display is "useful" in that it is reflected and propagates away from the display 100 within the view cone 110. However, some of the light is "non-useful" in that it is not reflected within the view cone 110. The angles at which the non-useful light impinges on the display 100 may be referred to as "non-useful" angles.

Useful and non-useful light are illustrated in FIG. 8. Depending upon their angle of incidence on the surface 102, rays of light are reflected differently and propagate away from the display 100 at different angles. For example, rays incident on the surface 102 at angles within the view cone may be reflected out of the display 100 at angles that are also within the view cone 110. In one example, ray 130 is incident on the surface 102 at an angle within the view cone 110. The ray 130 passes into the body 101 and continues to propagate through the body 101 until it contacts the reflective surface 103, which reflects the ray 130 back out of the body 101. The ray 130 exits the body 101 and propagates away from the display 100 within the view cone 110.

Other rays of light may be incident on the body 101 at angles that are outside of the view cone 110. As an example, ray 140 is incident on the body 101 at an angle outside of the view cone 110. The ray 140 passes into the body 101, and is reflected out of the body 101 by the reflective surface 103. Rays such as the ray 140 are non-useful light for image formation purposes since they are not reflected out of the display 100 within the view cone 110. As a result, such rays are not perceived by the viewer 104 as contributing to the brightness of an image shown on the display 100.

Figure 9:
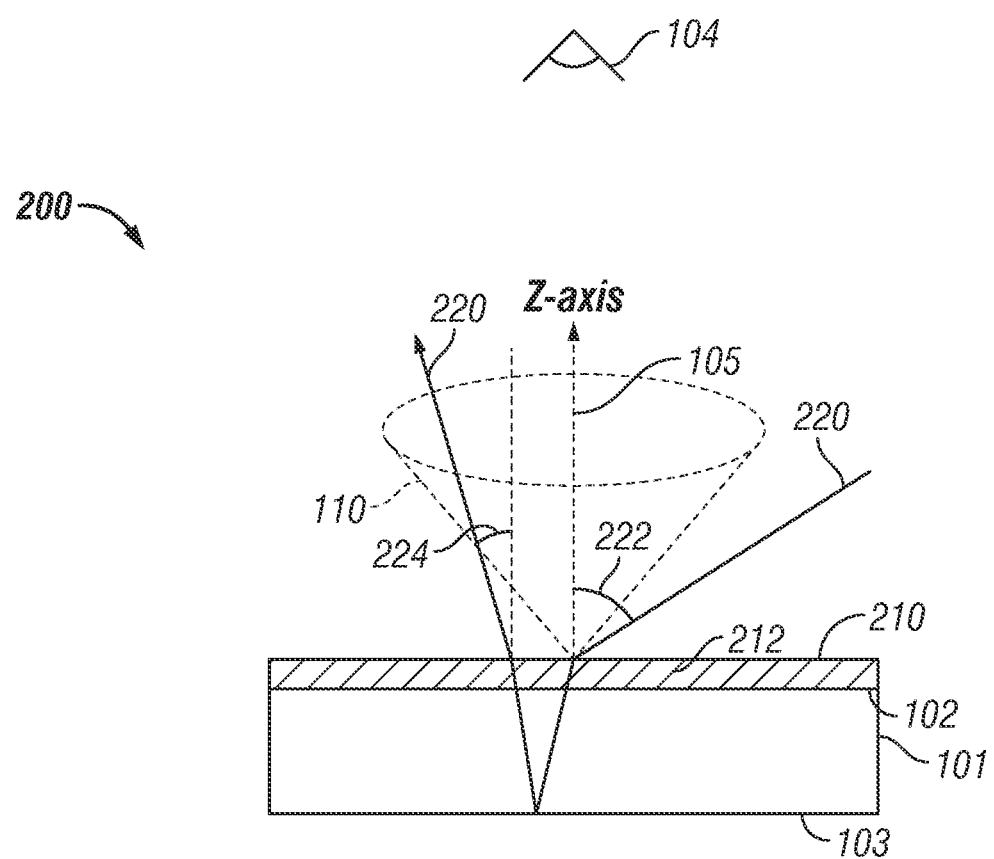

In some implementations, non-useful light can be captured and converted into useful light. With reference to FIG. 9, an example of a cross section of a portion of a display 200 is schematically illustrated. The display 200 includes the body 101, the major surface 102, the reflective surface 103, and the view cone 110 as discussed with respect to FIG. 8.

An optically transmissive holographic element 210 is provided over the major surface 102. The surface 102 is the side of the display 100 facing the viewer and may be considered the image-displaying side of the display 100. The holographic element 210 may be a holographic film having a hologram 212 recorded in it. The hologram 212 may be a volume or surface hologram. In the illustrated implementation, the hologram 212 is a volume hologram, which provides a smooth surface and has advantages for ease of workability (e.g., for attachment to other surfaces) in the display 200. The hologram 212 is configured, or recorded, so that light turning features constituting the hologram 212 turn light from non-useful angles such that, after being turned, this light passes into the body 101 and is then reflected and propagates away from the display 200 within the view cone 110; that is, the reflected light exits the display 200 at an angle that is within the view cone 110.

Light ray 220 is an example of non-useful light that is turned by the hologram 212 and made useful. The light ray 220 is incident on the holographic element 210 at an angle 222 from the axis 105 that is outside of the view cone 110; that is, outside of the range of angles encompassed by the view cone 110. For example, the ray 220 may be incident on the holographic film 210 at an angle of 222, which is depicted greater than about 45° relative to the axis 105. In some implementations, the angle 222 may be greater than about 60° relative to the axis 105, or the normal. The ray 220 passes into the holographic element 210 and is diffracted by the hologram 212 to such a degree that the ray 220 passes into the body 101 and continues to the reflective surface 103, where it is reflected and directed out of the display 200 at an angle 224 from the normal that is within the view cone 110; that is, within the range of angles encompassed by the view cone 110. In some implementations, the angle 224 is within a range of about ±60°, or about ±45°, relative to the normal to the major surface 102.

Figure 10:
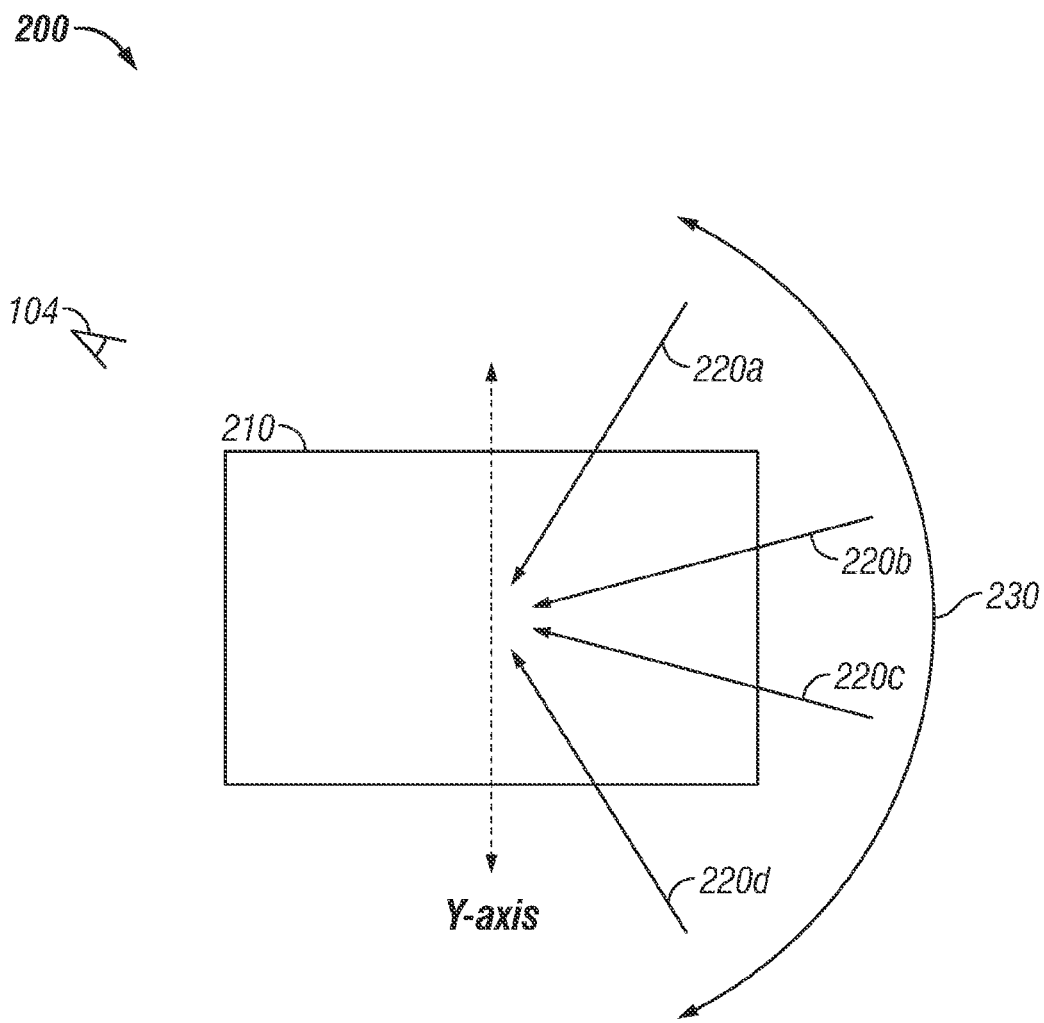
FIG. 10 shows an example of a top-down plan view of a portion of a display.

FIG. 10 illustrates an example of a top-down plan view of a portion of the display 200. It will be appreciated that the ray 220 can be incident on the holographic element 210 from multiple different directions. For example, the angle 222 in FIG. 9 relative to the axis 105 can vary. In addition, as shown in FIG. 10, the angles made by non-useful incident rays 220a-220d on the x-y plane can vary. For example, the rays 220a-220d can impinge on the holographic element 210 from a range of angles 230 relative to, e.g., the y-axis.

While the non-useful light may come to the holographic element 210 from different directions, holograms typically are most efficient at turning light from a single direction, since holograms are typically formed by light striking a holographic film from one direction. As a result, the hologram 212 (FIG. 9) is most efficient at turning light from that one direction. Light incident on the hologram 212 from directions different from that one direction may be turned with a relatively low turning efficiency and the turning of that light may also cause color shifts.

Consequently, in some implementations, the hologram 212 is configured to turn light impinging on the holographic element 210 from multiple directions. It will be appreciated that the hologram 212 may be formed by striking a holographic film with light rays that converge in the body of the film. In some implementations, the hologram 212 is formed using a first set of light sources, arrayed at a plurality of directions around a holographic film. A second set of one or more light sources directs light into the holographic film so that the light rays from that second set are, e.g., from the direction of the viewer (e.g., normal to the major surface of the holographic film). A hologram is formed at the convergence of the light from the first and second sets of light sources. The angles that the light from the first set of light sources form when impinging on the holographic film correspond to the angles of the light that the holographic film is configured to turn. In some implementations, rather than using a plurality of light sources for each set of light sources, for one or both sets of light sources, one or a limited number of light sources can be passed through a diffuser to form the hologram 212; the diffuser can cause light to strike the holographic film at different angles.

In addition, the light spectrum of the light sources used to form the hologram 212 may be selected to form a hologram that will turn light within a desired wavelength range (e.g., within the visible spectrum). This may be accomplished by appropriate selection of the wavelengths of light used to form the hologram 212. In some implementations, the wavelengths of light used to form the hologram 212 are the same as the wavelengths of light that the hologram 212 is configured to turn. In some other implementations, the hologram 212 can be configured to turn light of only one wavelength, if desired. Thus, the hologram 212 may be configured to turn light of a desired range of wavelengths and from a desired number of directions.

Figure 11:
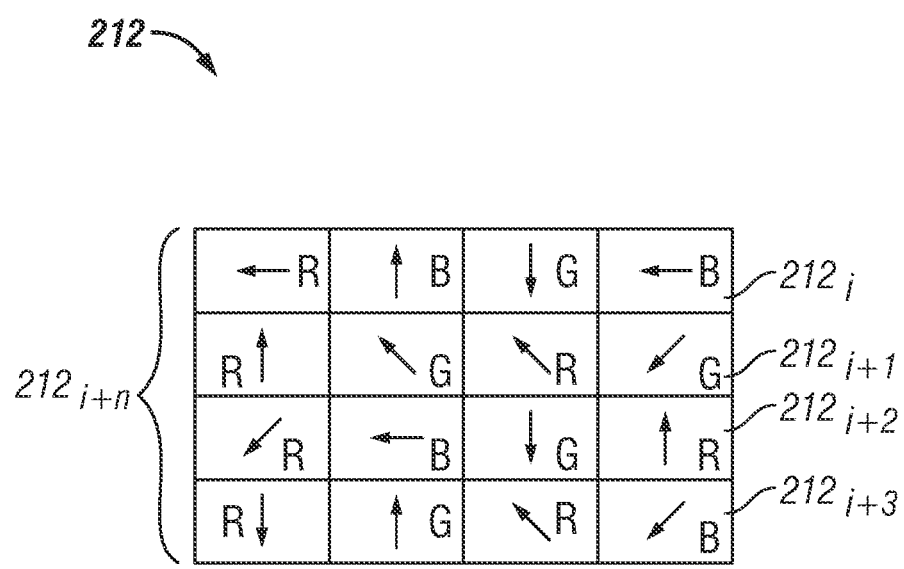
FIG. 11 shows an example of a top-down plan view of a portion of a hologram.

In some other implementations, the hologram 212 can be pixilated. The individual pixels can be configured to turn light of different wavelengths and/or from different directions. FIG. 11 illustrates an example of a top-down plan view of a portion of the hologram 212. The hologram 212 is provided with a plurality of separated and non-overlapping pixels $212_{i+n}$. Individual ones of the pixels $212_{i+n}$ are configured to turn light incident on the hologram 212 from one particular direction. Each individual one of the pixels $212_{i+n}$ can be further configured to turn light of one particular wavelength. The wavelengths of light can correspond to the individual colors produced by individual display elements of the display 200. In some implementations, the pixels $212_{i+n}$ are configured to turn light corresponding to the colors red, green and blue. Some pixels configured to turn light corresponding to different colors or oriented to turn light from different directions are indicated by reference numerals $212_i$, $212_{i+1}$, $212_{i+2}$, $212_{i+3}$.

The relative number of pixels of each type of pixel (e.g., pixels for a particular angle and color), or surface area occupied by each type of pixel, allows the response of the hologram to be tailored for the display. For example, in some applications, light may be expected to come from a limited number of directions. To turn a high proportion of the light from those directions, the population of pixels $212_{i+n}$ may contain a larger number or surface area of pixels configured to turn light from those particular directions than from any other directions, or the pixels may only turn light from those directions.

In another example, if the display 200 is expected to be movable and to shift orientation relative to a light source, the pixels $212_{i+n}$ may have a uniform density of similar pixels (or pixels of similar total surface area) configured to turn light from a uniform distribution of different desired directions. This uniformity in the light turning properties of the pixels $212_{i+n}$ incident on the display 200 improves the brightness uniformity of the display 200 as it is moved in normal operation.

In some implementations, the pixels $212_{i+n}$ may be used to adjust the color balance of the display 200. For example, the number or surface area of pixels $212_{i+n}$ that turn one or more colors can be increased to increase the intensity of the one or colors in images produced by the display 200. In one arrangement, the proportion of red light turned by the hologram 212 can be increased in displays that produce the color red at lower intensities than other colors. This increase in the intensity of the color red can be achieved by increasing the number or surface area of pixels $212_{i+n}$ that turn light corresponding to the color red, relative to pixels that turn light of other colors. In other arrangements, the intensity of one or more particular colors can be reduced by providing a lower number or surface area of pixels $212_{i+n}$ that turn light of those colors, relative to pixels $212_{i+n}$ that turn light of other colors. It will be appreciated that the relative surface area of a set of pixels can be changed by changing the absolute number of those pixels relative to other pixels, or the relative sizes of the pixels can be changed to achieve a desired total surface area for a particular type of pixel.

The pixels $212_{i+n}$ may be formed by various methods, such as by using a mask with openings that allow illumination of selected portions of the holographic film in a first position, and shifting the mask to other positions, e.g., second and third other positions, etc., and exposing the holographic film to light while the mask is in each position. Thus, an array of regularly repeating, discrete regions configured to turn light from a particular direction and at a particular wavelength may be formed. Each discrete region can constitute a pixel in the hologram. At each position, the holographic film can be exposed to laser light of a different wavelength and/or direction. The wavelength corresponds to the wavelength of light that the pixel is configured to turn. The laser light can include laser beams oriented substantially normal to the holographic film. In addition, a secondary beam, which can have the same wavelength as the substantially normal laser beam, can be directed into the holographic film at the same direction as light to be turned by the hologram.

It will be appreciated that various modifications to the implementations described herein are possible. For example, with reference again to FIGS. 9 and 10, to increase the light turning efficiency of the hologram 212, the range of light rays that the hologram 212 is configured to turn may be limited. The hologram 212 may be configured to turn light from a limited range of angles relative to the z-axis 105 or normal as in FIG. 9 and/or a limited range of angles relative to the y-axis as in FIG. 10. For example, with reference to FIG. 10, light may impinge on the hologram 210 from a range of directions which can have azimuths on the plane of the hologram 210. These azimuths can vary in a range from 0-360°. In some implementations, the rays 220a-220d correspond to the azimuths and the range of angles 230 over which the rays 220a-220d extend can be limited to, e.g., a range of about 270° or about 180° as viewed on the x-y plane on which is the major surface 102 (FIG. 9) or the holographic is disposed. For example, taking a central point on the hologram 210 as a reference point and the x-y plane defined by the hologram 210 as a reference plane, the azimuths for light turned by the hologram can extend in a range of about 0-270° or about 0-180°. Due to the configuration (e.g., positions of control and input devices) of devices containing the display 200, the viewer 104 and ambient light sources will typically be positioned at a predetermined position relative to the display 200. For example, where the display is part of a hand-held device, or upright display (e.g., a monitor), it is possible that the device will be positioned with one end of the display 200 pointed upwards, such as towards the sky. Since the sun or overhead lighting may be an expected primary source of ambient light, the hologram 212 may be configured to turn light coming from directions at one end of the display 200 (e.g., which may be expected to point towards ambient light sources), but not light coming from the direction of the opposite end of the display (e.g., which may be expected to point towards the ground, away from ambient light sources). In some implementations, a first set of directions for which the hologram 212 is configured to turn light spans about 180° on the x-y plane of the display 200 and the hologram 212 is not configured to turn light, or configured to not turn light, incident on the display 200 from other directions opposite that first set of directions. The angles which the hologram 212 is not configured to turn light correspond to those directions that are not expected to point towards an ambient light source.

In some implementations, such as in FIG. 9, the hologram 212 can be configured to turn ambient light so that it reflects off the reflective surface 103 such that the reflected light propagates away from the display 200 at multiple different angles within the view cone 110. For example, for light rays coming from a single, particular direction, the hologram 212 can be configured to turn those light rays such that each is reflected and propagates away from the display 200 at one of a plurality of different angles within the view cone 110. In some arrangements, the set of pixels $212_{i+n}$ configured to turn light coming from a single direction also can contain multiple sub-sets of pixels, with each sub-set configured to turn light into the body 101 at a different angle from that of other sub-sets, so that the light from that single direction is reflected and propagates away from the display 200 at a different angle from that of other subsets. Such an arrangement can increase the brightness uniformity of images as the viewing angle changes within the view cone 110.

It will be appreciated that the holographic element 210 has been illustrated as the uppermost part of the device 200 for ease of illustration and discussion. Other materials may be disposed over the holographic element 210. For example, anti-reflective and/or scratch-resistant layers may be provided over the holographic element 210. It will also be appreciated that other materials may be provided between the holographic element 210 and the body 101.

Rather than simply turning light of one wavelength or from one direction, it will be appreciated that individual pixels $212_{i+n}$ also can be configured to turn light of one or more different wavelengths and/or one or more different directions. However, in some implementations, as the efficiency of light turning decreases as an individual pixel $212_{i+n}$ is made to turn light of more directions or wavelengths, the number of directions and the number of colors can be limited to one.

Figure 12A:
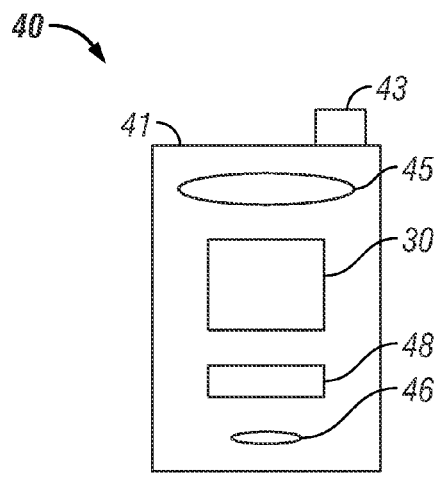
FIGS. 12A and 12B show examples of system block diagrams illustrating a display device that includes a plurality of interferometric modulators.
Figure 12B:
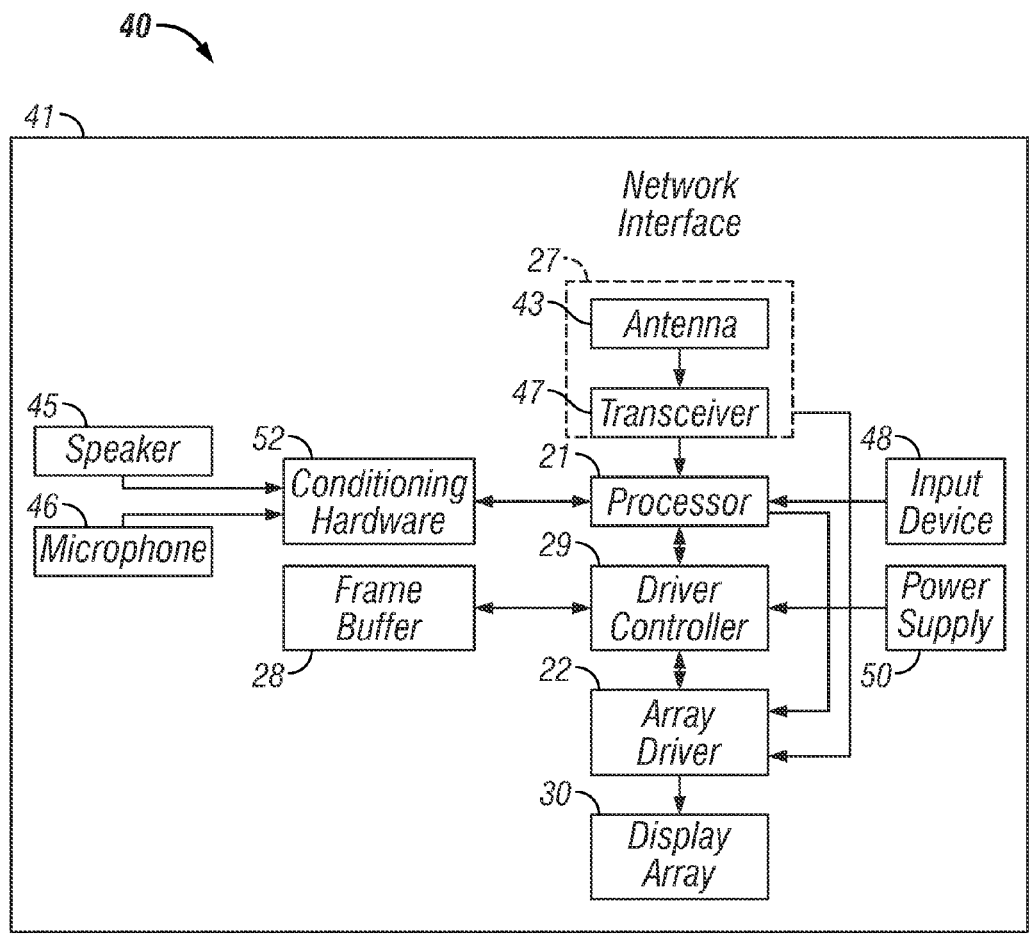

FIGS. 12A and 12B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 12B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display device, comprising:
an array of display elements; and
a holographic film overlying the display elements, the holographic film comprising a pixilated hologram,
wherein the hologram is configured to turn ambient light incident on the holographic film towards the array of display elements such that the turned light is reflected and propagates away from the display device at angles within a view cone of the display device, wherein a range of light that the hologram is configured to turn consists of light incident on the holographic film at angles outside of the view cone of the display device, wherein some pluralities of pixels of the hologram are configured to turn light incident on the hologram from a first direction without turning incident light from a second direction and wherein other pluralities of pixels of the hologram are configured to turn light incident on the hologram from the second direction without turning incident light from the first direction.

2. The device of claim 1, wherein the display elements comprise interferometric modulators, each interferometric modulator including a reflective surface for reflecting the turned light.

3. The device of claim 1, wherein a reflective surface for reflecting the turned light underlies the array of display elements.

4. The device of claim 1, wherein a reflective surface for reflecting the turned light is integral with the array of display elements.

5. The device of claim 1, wherein the turned light is incident on the hologram from a plurality of directions.

6. The device of claim 5, wherein the hologram is configured to not turn light from directions opposite the plurality of directions.

7. The device of claim 1, wherein different pluralities of pixels of the hologram are configured to turn light of different colors.

8. The device of claim 7, wherein the pixels are biased to turn light of one or more particular colors relative to other colors.

9. The device of claim 8, wherein the pixels configured to turn light of any of the one or more particular colors outnumber pixels configured to turn light of any other one color.

10. The device of claim 1, wherein pixels forming the hologram have a minimum width or length of about 100 µm.

11. The device of claim 1, wherein the view cone is within about ±60° of a normal to a major surface of the display.

12. The device of claim 11, wherein the view cone is within about ±45° of a normal to a major surface of the display.

13. The device of claim 1, further comprising:
a processor that is configured to communicate with the display elements, the processor being configured to process image data; and
a memory device that is configured to communicate with the processor.

14. The device of claim 13, further comprising:
a driver circuit configured to send at least one signal to said display.

15. The device of claim 14, further comprising:
a controller configured to send at least a portion of said image data to said driver circuit.

16. The device of claim 13, further comprising:
an image source module configured to send said image data to said processor.

17. The device of claim 16, wherein said image source module comprises at least one of a receiver, transceiver, and transmitter.

18. The device of claim 13, further comprising:
an input device configured to receive input data and to communicate said input data to said processor.

19. A display device, comprising:
a first means for reflecting incident light outward from an image-displaying side of the display system to form a displayed image; and
a second means for selectively turning light depending on the location of incidence of the light on the display device, wherein the second means turns the light towards the first means such that the turned light is reflected from the first means and the reflected turned light propagates away from the display device at angles within a view cone of the display device, wherein a range of light that the second means is configured to turn consists of light incident on the second means at angles outside of the view cone of the display device, the second means comprising a pixilated hologram, wherein some pluralities of pixels of the hologram are configured to turn light incident on the hologram from a first direction without turning incident light from a second direction and wherein other pluralities of pixels of the hologram are configured to turn light incident on the hologram from the second direction without turning incident light from the first direction.

20. The device of claim 19, wherein the first means is a plurality of interferometric modulators.

21. The device of claim 19, wherein the hologram is a volume hologram.

22. The device of claim 19, wherein the view cone is within about ±60° of a normal to a major surface of the display device.

23. The device of claim 19, wherein the hologram is provided in a holographic film disposed on a display comprising the first means, wherein the first means is a plurality of interferometric modulators.

24. The device of claim 19, wherein different pluralities of the pixels of the hologram are configured to turn light of different colors.

25. A method for manufacturing a display device, comprising:
providing a display having a reflective layer; and
providing a holographic film on the display, the holographic film including a pixilated hologram configured to turn light incident on the display device towards the reflective layer such that the turned light is reflected off the reflective layer and the reflected turned light propagates away from the display device at angles within a view cone, wherein a range of light that the hologram is configured to turn consists of light incident on the holographic film at angles outside of the view cone, wherein some pluralities of pixels of the hologram are configured to turn light incident on the hologram from a first direction without turning incident light from a second direction and wherein other pluralities of pixels of the hologram are configured to turn light incident on the hologram from the second direction without turning incident light from the first direction.

26. The method of claim 25, wherein providing the holographic film includes attaching the holographic film to the display.

27. The method of claim 25, wherein providing the display includes forming a plurality of interferometric modulators, the interferometric modulators forming pixels of the display.

28. The method of claim 25, wherein providing the holographic film includes forming the hologram by directing laser light through a diffuser and into the holographic film.

29. The method of claim 25, wherein providing the holographic film includes forming the hologram by separately forming pluralities of regularly spaced apart holographic light turning structures.

30. The method of claim 29, wherein each plurality of holographic light turning structures is formed by striking the holographic film with light of a different wavelength.

31. The method of claim 29, wherein each plurality of holographic light turning structures is formed by striking the holographic film with light incident on the film from a different direction.

* * * * *

UNITED STATES PATENT AND TRADEMARK OFFICE
CERTIFICATE OF CORRECTION

PATENT NO. : 8,902,484 B2  
APPLICATION NO. : 12/969224  
DATED : December 2, 2014  
INVENTOR(S) : Russell Wayne Gruhlke et al.

It is certified that error appears in the above-identified patent and that said Letters Patent is hereby corrected as shown below:

IN THE SPECIFICATION

In column 1 at line 15 (approx.), Change "minors)" to --mirrors)--.

In column 7 at line 8, Change "minor," to --mirror,--.

Signed and Sealed this  
Thirteenth Day of October, 2015

Michelle K. Lee  
*Director of the United States Patent and Trademark Office*